US011653270B2

(12) United States Patent
Melander et al.

(10) Patent No.: US 11,653,270 B2
(45) Date of Patent: *May 16, 2023

(54) COMMUNICATION OF APPLICATION TRANSACTIONS ON A RADIO LINK

(71) Applicant: Telefonaktiebolaget LM Ericsson (publ), Stockholm (SE)

(72) Inventors: Ola Melander, Wuerselen (DE); Branko Djordjevic, Herzogenrath (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,077

(22) Filed: Nov. 9, 2020

(65) Prior Publication Data

US 2021/0058828 A1 Feb. 25, 2021

Related U.S. Application Data

(63) Continuation of application No. 16/083,554, filed as application No. PCT/EP2016/055462 on Mar. 14, 2016, now Pat. No. 10,869,231.

(51) Int. Cl.
| | |
|---|---|
| *H04W 28/24* | (2009.01) |
| *H04W 72/04* | (2023.01) |
| *H04W 72/08* | (2009.01) |
| *H04L 43/028* | (2022.01) |
| *H04M 15/00* | (2006.01) |
| *H04W 72/0453* | (2023.01) |
| *H04W 80/02* | (2009.01) |

(52) U.S. Cl.
CPC .......... *H04W 28/24* (2013.01); *H04L 43/028* (2013.01); *H04M 15/66* (2013.01); *H04W 72/048* (2013.01); *H04W 72/0453* (2013.01); *H04W 72/08* (2013.01); *H04W 80/02* (2013.01)

(58) Field of Classification Search
CPC ............. H04W 28/24; H04W 72/0453; H04W 72/048; H04W 72/08; H04W 80/02; H04L 43/028; H04M 15/66
See application file for complete search history.

(56) References Cited

U.S. PATENT DOCUMENTS 8,005,087 B2 * 8/2011 Dolganow ........ H04W 72/1236
370/392
8,665,724 B2 * 3/2014 Stanwood ............ H04N 21/262
370/235

(Continued)

FOREIGN PATENT DOCUMENTS

WO 2014191021 A1 12/2014

OTHER PUBLICATIONS

3rd Generation Partnership Project, "3rd Generation Partnership Project; Technical Specification Group Services and System Aspects; Policy and charging control architecture (Release 13)", Technical Specification, 3GPP TS 23.203 V13.6.0, Dec. 1, 2015, pp. 1-242, 3GPP, France.

(Continued)

*Primary Examiner* — Abdullahi Ahmed
(74) *Attorney, Agent, or Firm* — Coats & Bennett, PLLC

(57) ABSTRACT

An application transaction comprised in a payload section of at least one data unit is identifying. In response to identifying the application transaction, allocation of radio resources for transmission of the at least one data unit on a radio link is controlled.

19 Claims, 15 Drawing Sheets

(56) References Cited

U.S. PATENT DOCUMENTS

| | | | |
|---|---|---|---|
| 10,869,231 B2* | 12/2020 | Melander | H04M 15/66 |
| 2006/0233101 A1* | 10/2006 | Luft | H04L 43/08 |
| | | | 370/400 |
| 2010/0067400 A1* | 3/2010 | Dolganow | H04W 72/1236 |
| | | | 370/253 |
| 2013/0290492 A1* | 10/2013 | ElArabawy | H04W 28/0289 |
| | | | 709/219 |
| 2014/0106770 A1* | 4/2014 | Valentin | H04W 4/50 |
| | | | 455/452.1 |
| 2016/0330111 A1* | 11/2016 | Manghirmalani | H04L 43/028 |
| 2021/0058827 A1* | 2/2021 | Holmstrom | H04W 72/02 |

OTHER PUBLICATIONS

Information Sciences Institute, "Internet Protocol; DARPA Internet Program; Protocol Specification", RFC 791, Sep. 1, 1981, pp. 1-50, Information Sciences Institute, University of Southern California, US.

3rd Generation Partnership Project, "Overview of 3GPP Release 12 1 V0.2.0", Sep. 16, 2015, pp. 1-296, 3GPP, France.

\* cited by examiner

| Application | 280 |
| Transport | 281 |
| PDCP | 292 |
| RLC | 293 |
| MAC | 294 |
| PHY | 295 |

COMMUNICATION OF APPLICATION TRANSACTIONS ON A RADIO LINK

RELATED APPLICATIONS

This application is a continuation of prior U.S. application Ser. No. 16/083,554, filed 10 Sep. 2018, which was the National Stage of International Application PCT/EP2016/055462 filed 14 Mar. 2016, the entire disclosure of each being hereby incorporated by reference herein.

TECHNICAL FIELD

Various embodiments relate to a method comprising an application transaction and controlling allocation of radio resources in response to identifying the application transaction. Various embodiments relate to a corresponding device.

BACKGROUND

Transmission service agreements provide a guaranteed quality of service (QoS) to subscribers of a radio network such as a cellular network. Typically, transmission service agreements specify the QoS in terms of a guaranteed bit rate (GBR). E.g., in the Third Generation Partnership (3GPP) Long Term Evolution (LTE) radio access technology (RAT), the GBR is defined in terms of bits per second, see 3GPP Technical Specification (TS) 3GPP Technical Specification (TS) V13.6.0 (2015-12) Chapter 6.1.7.

The GBR typically specifies the likelihood that a certain bit rate is achieved. E.g., the GBR may specify that a certain bit rate is achieved for a certain percentage of communication instances and/or a certain fraction of time. E.g., the GBR may specify that a bit rate of 1 Mbps is achieved 99.5% of the time. In such a scenario it is possible that less than 1 Mbps is provided during 0.5% of the time.

Such an on-average definition of the GBR imposes certain drawbacks and restrictions. E.g., where deviations to lower bit rates are possible due to the on-average definition of the GBR, it is possible that the connectivity of an application temporarily suffers. E.g., where temporarily insufficient radio resources are allocated for transmission of data units associated with the application, connectivity of the application may be disturbed.

To ensure connectivity for applications, in some scenarios so-called overprovisioning is employed. Overprovisioning relates to preemptively allocating radio resources with certain headroom or buffer-range such that individual atomic functions of an application (application transactions) are likely to be successfully communicated during the certain duration. Overprovisioning can result in excess allocation of radio resources, thereby degrading the overall performance of a radio link, increasing system complexity, and increasing operating costs; on the other hand side, by overprovisioning may help to achieve an on-average connectivity of the application, but may not guarantee successful communication individual application transaction by its own.

SUMMARY

Accordingly, a need exists for advanced techniques of controlling allocation of radio resources which overcome or mitigate at least some of the above-identified drawbacks and restrictions.

This need is met by the features of the independent claims. The dependent claims define embodiments.

According to various embodiments, a method comprises identifying an application transaction. A payload section of at least one data unit comprises the application transaction. The method further comprises, in response to identifying the application transaction: controlling allocation of radio resources for transmission of the at least one data unit on a radio link. The method further comprises executing communication of the application transaction via the radio link by transmitting the at least one data unit using the radio resources.

According to various embodiments, a device is provided. The device comprises a memory. The memory is configured to store instructions executable by at least one processor. The device further comprises the at least one processor. The at least one processor is configured to execute the instructions to perform: identifying an application transaction comprised in a payload section of at least one data unit; and, in response to identifying the application transaction: controlling allocation of radio resources for transmission of the at least one data unit on the radio link; and executing communication of the application transaction via the radio link by transmitting the at least one data unit using the radio resources.

According to various embodiments, a device is provided. The device comprises a module for identifying an application transaction. A payload section of at least one data unit comprises the application transaction. The device further comprises a module for controlling allocation of radio resources for transmission of the at least one data unit on a radio link in response to identifying the application transaction. The device further comprises a module for executing communication of the application transaction via the radio link by transmitting the at least one data unit using the radio resources.

According to various embodiments, a computer program product comprises program code to be executed by at least one processor. Executing the program code causes the at least one processor to perform a method. The method comprises identifying an application transaction. A payload section of at least one data unit comprises the application transaction. The method further comprises, in response to identifying the application transaction: controlling allocation of radio resources for transmission of the at least one data unit on a radio link. The method further comprises executing communication of the application transaction via the radio link by transmitting the at least one data unit using the radio resources.

According to various embodiments, a computer program comprises program code to be executed by at least one processor is provided. Executing the program code causes the at least one processor to perform a method. The method comprises identifying an application transaction. A payload section of at least one data unit comprises the application transaction. The method further comprises, in response to identifying the application transaction: controlling allocation of radio resources for transmission of the at least one data unit on a radio link. The method further comprises executing communication of the application transaction via the radio link by transmitting the at least one data unit using the radio resources.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 2 schematically illustrates a protocol stack for transmission via the radio link according to various embodiments.

DETAILED DESCRIPTION OF EMBODIMENTS

Figure 1A:
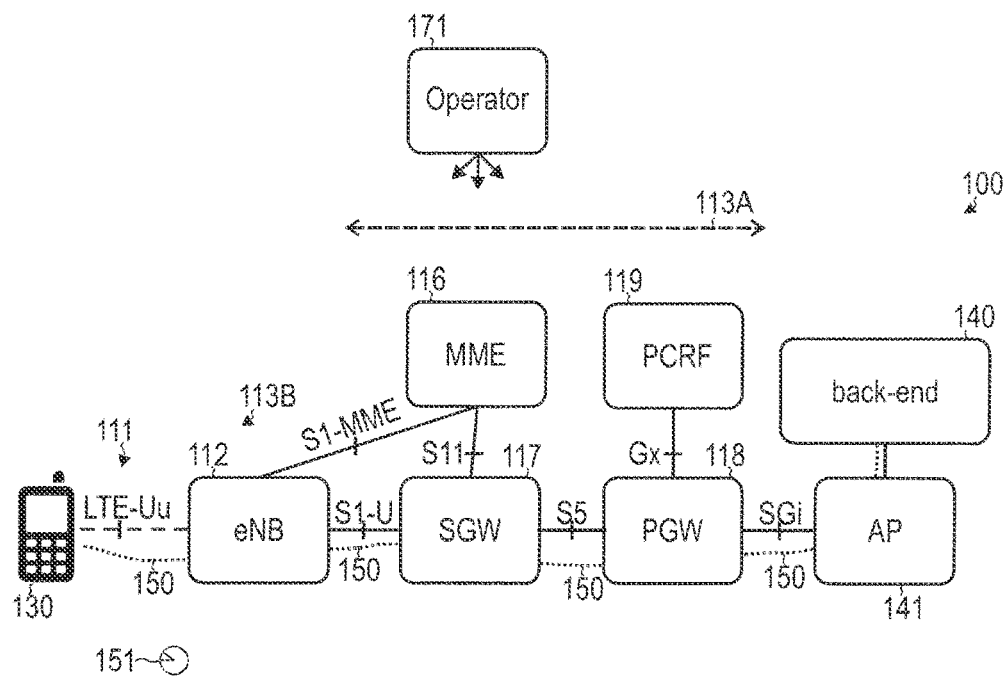
FIG. 1A schematically illustrates a cellular network comprising a radio link according to various embodiments.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of controlling allocation of radio resources for transmission of at least one data unit on a radio link of a network are described.

The radio resources may correspond to time-frequency resources comprising one or more modulated symbols for transmitting data via the radio link. The radio resources may be associated with a shared channel. As such, the radio resources may be shared radio resources that are shared between a plurality of terminals attached to the network. Allocation of radio resources thus may serve the purpose of avoiding conflicts over the radio resources. The process of allocating radio resources to a plurality of terminals and distributing the radio resources across the plurality of terminals is sometimes referred to as scheduling. In some examples, properties of the shared channel may be adjusted based on performance characteristics of transmission on the radio link: e.g., indicators received from the plurality of terminals can be considered. The process of adjusting properties of the shared channel based on the feedback of the plurality of terminals is sometimes referred to as link adaptation.

The techniques described herein control the allocation of radio resources in response to identifying an application transaction on a payload section of at least one data unit. Controlling the allocation may comprise monitoring and, if necessary, configuring link adaptation and/or scheduling. Thus, it is possible that link adaptation and/or scheduling is passively monitored in some examples in response to identifying the application transaction; while, in further examples, it is possible that link adaptation and/or scheduling is actively controlled. Controlling the allocation of the radio resources can, thus, comprise allocating the radio resources.

Controlling the allocation in response to identifying the application transaction may comprise controlling the allocation depending on properties of the application transaction, the payload section of the at least one data unit, and/or the at least one data unit. Controlling the allocation in response to identifying the application transaction may be triggered by identifying the application transaction.

In some examples, controlling may be for compliance of the communication of the application transaction with the transaction service agreement. The transaction service agreement may specify QoS with respect to the communication of application transaction. Thus, if compared to conventional transmission service agreements, the QoS can be specified with respect to the higher-layer application transaction. The transactions service agreement may specify, e.g., a guaranteed number of executed communications of application transactions and, hence, may define a transaction success rate. The transaction service agreement may specify, e.g., a guaranteed number of executed communications of application transactions per time unit; the time unit may be specified, thereby defining a time-to-execute. By means of the transaction service agreement it may be possible to specify a certain success rate for the communication of the application transactions. In may be possible to specify latency requirements.

The application transaction may correspond to data associated with an application of one or more application layers. A single application transaction may comprise one or more messages, e.g., a request message and/or a response message. An application transaction may be transmitted and/or received (communicated) in uplink (UL) direction and/or in downlink (DL) direction. As such, an application transaction may be initiated by a terminal attached to the network and/or a backend server. The application layers are typically upper layers of a protocol stack; as such, the application layers are typically not directly involved in over-the-air transmission. The application transaction may be an atomic function of the application. The application transaction, in a simple scenario, may comprise a request and a positive/negative response. In case no response or a negative response is received, in some scenarios of the application transaction may considered to have failed; in such a scenario, a rollback can be implemented, the rollback canceling the effect of the application transaction has had so-far. It may be possible to use timeouts to determine whether a response is received or not received. E.g., a typical timeout duration of a right command of an application transaction can be in the order of 30 seconds before considering that the application transaction has failed. Such a timeout criterion can be described as a transaction time indicating the time it takes to perform an application transaction. In case of sequential application transactions, the inverse of the transaction time can be referred to as transaction rate.

The application transaction may comprise a command or information associated with the application. E.g., the application transaction may comprise an Hypertext Transfer Protocol (HTTP) command. E.g., the application transaction may comprise a request/response pair, e.g., an HTTP GET request/response pair (HTTP GET operation). The application transaction may not comprise a speech sample, e.g., of a Voice over LTE (VoLTE) Service.

A data unit native to a lower layer—if compared to the application layer—may comprise the application transaction. E.g., the data unit may be native to a lower layer—if compared to the application layer—, the lower layer implementing the resource allocation. Examples of lower layers include a data link layer and a network layer.

For identifying the application transaction comprised in the payload section of the at least one data unit, different techniques (detection schemes) may be employed. E.g., a detection scheme relying on deep packet inspection (DPI) or shallow packet inspection (SPI) may be employed. E.g., a header section and/or the payload section of the at least one data unit may be inspected according to DPI and/or SPI. DPI and/or SPI may not be applicable or only applicable to a limited degree in case of encrypted traffic. Here, the payload section may be encrypted based on an encryption key. In some examples, the encryption key may be available for performing DPI and/or SPI after, e.g., temporary, decryption. Alternatively or additionally, a detection scheme relying on explicit control signaling indicative of the at least one data unit which comprises the application transaction can be implemented.

Various examples of the techniques described herein thus enable to logically link application transactions and lower-layer resource allocation. In this sense, layer-based encapsulation may be overcome, at least temporarily. The techniques described herein allow for implementing an application relying on application transactions with superior connectivity. In particular, conformity with a transaction service agreement may be ensured.

The techniques described herein may be applied in various use-cases. An example use-case is a business-to-business (B2B) system or an IT system operating based on the concept of application transactions. An example of a B2B transaction is a request from one company's server directed to a second company's server. E.g., such a request may relate to information queries, e.g., to list spare parts in a stock. A further example use-case is an IT system transaction:, a block of data can be written or read to or from a disk system of the backend. The write or read/response pair embodies an application transaction. A further example use-case is the Internet of Things where a large amount of devices communicates. E.g., automation and/or surveillance devices can implement application transaction-based services. Various examples may be applied to Machine Type Communication (MTC).

FIG. 1 schematically illustrates an architecture of a cellular network 100 which may be used for implementing the concepts as outlined above. FIG. 1 is an example disclosed in the context of the Third Generation Partnership (3GPP) Long Term Evolution (LTE) for illustrative purposes only. Similar techniques as disclosed herein can be readily applied to various kinds of 3GPP-specified networks, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA). Similar techniques may be applied to 3GPP 5G technology. However, operation of the network is not limited to the scenario of a cellular network or a 3GPP-specified network. E.g., at least parts of the radio link(s) of the wireless network could be operated according to the Wireless Local Area Network (WLAN or Wi-Fi) radio access technology (RAT), Bluetooth, Near Field Communication, or satellite communication.

In FIG. 1, a terminal 130 is connected via E-UTRA RAT 113B to an radio access node embodied by an evolved NodeB (eNB) 112. The eNB 112 and the terminal 130 communicate using packetized traffic via a radio link 111. Various channels may be implemented on the radio link 111 for utilizing communication of data via the radio link 111. Such channels may include logical channels. The channels may be associated with dedicated time-frequency radio resources on the radio link 111. The channels may include a Physical DL Control Channel (PDCCH) corresponding to a DL control channel, a Physical UL Control Channel (PUCCH) corresponding to an UL control channel, a Physical DL Shared Channel (PDSCH) corresponding to a DL payload channel, and a Physical UL Shared Channel (PUSCH) corresponding to a UL payload channel. The channels may also include a Physical Hybrid Automatic Repeat Request Indicator Channel (PHICH) usable for re-transmission control of payload data. For shared channels, radio resources may be shared between a plurality of terminals attached to the cellular network 100 (not shown in FIG. 1A).

In FIG. 1, the terminal 130 is connected to a packet data network (PDN) backend 140 via a data bearer 150 (illustrated by the dotted line in FIG. 1) and to an access point node 141. The backend 140 may offer an application; the application may comprise the communication of application transactions. E.g., the backend 140 may comprise cloud storage, a database, etc.

E.g., the bearer 150 may be implemented by a plurality of interconnecting sub-bearers and/or secure tunnels facilitating communication of data. E.g., the bearer 150 may be identified by an Internet Protocol (IP) address of the terminal 130. E.g., the bearer 150 may be identified by a bearer identification (bearer ID). E.g., the bearer 150 may be identified by an IP address of an access point node 141 and/or of the backend 140.

The bearer 150 is typically associated with a certain quality of service (QoS) requirement specified by a transmission service agreement 151. E.g., the QoS requirement may be specified by a QoS class identifier (QCI) associated with the bearer 150. The QoS requirement, in particular, may relate to a GBR and/or a latency. E.g., the latency may be specified in-between certain layers of the protocol stack between two nodes of the cellular network 100. E.g., the latency may correspond to a delay between requesting data associated with the service and receiving the requested data.

The bearer 150 may carry packetized data comprising payload data and/or control data. The payload data may relate to data used by higher layers of a protocol stack, e.g., an application layer. The payload data may correspond to the application transactions communicated between the terminal 130 and the backend 140. The payload data may be user-specific for a subscriber associated with the terminal 130 connectable to the cellular network 100 and/or the bearer 150.

FIG. 1 further schematically illustrates the evolved packet system (EPS) architecture of the LTE RAT. The EPS comprises an evolved packet core (EPC) as a core network 113A and the E-UTRA 113B.

The reference point—typically also called "interface"—implemented by the radio link 111 between the terminal 130 and the eNB 112 operates according to the LTE-uU protocol. The bearer 150 may pass along the radio link 111.

The eNB 112 is connected to a Serving Gateway (SGW) 117 implementing a gateway between the radio access network and the core network. As such, the SGW 117 may route and forward data and may act as a mobility anchor of the user plane during handovers of the terminal 130 between different cells of the cellular network 100. The reference point between the eNB 112 and the SGW 117 operates according to the S1-U protocol.

The SGW 117 is connected via a reference point operating according to the S5 protocol to a further gateway node implemented by, e.g., a Packet Data Network Gateway (PGW) 118. The PGW 118 serves as a point of exit and point of entry of the cellular network 100 for data packets of the bearer 150 towards the backend 140. As such, the PGW is connected with the access point node 141 of the backend 140 via a reference point operating according to the SGi protocol.

Access functionalities of the terminal 130 to the backend 140, e.g., access functionality to the bearer 150, may be controlled by a control node implemented by a Mobility Management Entity (MME) 116. The MME 116 is connected via a reference point operating according to the S1-MME protocol with the eNB 112. Further, the MME 116 is connected via a reference point operating according to the S11 protocol with the SGW 117. E.g., the MME 116 may check whether the subscriber associated with the terminal 130 is authorized to establish the bearer 150 by accessing the access point node 141.

Policy and charging functionality of the bearer 150 is controlled by a control node 119 implemented for example by a Policy and Charging Rules Function (PCRF) 119. The PCRF 119 is connected via a reference point operating according to the Gx protocol with the PGW 118. The PGW 118 may implement a Policy and Charging Policy and Charging Enforcement Function (PCEF) which is controlled by Policy and Charging Control (PCC) rules provided by the PCRF 119 via the Gx protocol.

An operator node 171 (hereinafter: operator) is configured to communicate with the various nodes 112, 116, 117, 118, 119, 141, 140, 130. The operator 171 can configure operation of the nodes 112, 116, 117, 118, 119, 141, 140, 130.

For transmission via the radio link 111, radio resources are allocated by the eNB 112. In particular, where a plurality of terminals is attached to the cellular network 100 via the eNB 112, the eNB 112 performs scheduling and link adaptation in order to optimize throughput of transmission on the radio link 111 across the plurality of terminals.

Figure 1B:
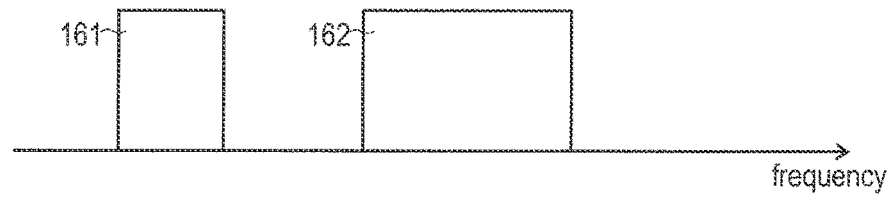
FIG. 1B schematically illustrates different frequency bands on which radio resources can be allocated for transmission of data units via the radio link according to various embodiments.

Radio resources may be allocated in different frequency bands. FIG. 1B illustrates examples with respect to allocating radio resources in different frequency bands 161, 162. In the example of FIG. 1B, the frequency bands 161, 162 are non-overlapping. The frequency bands 161, 162 correspond to different carriers. FIG. 1B corresponds to a Carrier Aggregation (CA) scenario. E.g., the different frequency bands 161, 162 can have a different bandwidth. In the 3GPP LTE RAT, the bandwidth may amount to one of the following: 1.4 MHz; 3 MHz; 5 MHz; 10 MHz; 15 MHz; and 20 MHz. The different frequency bands 161, 162 may be selectable for allocation of radio resources.

Figure 1C:
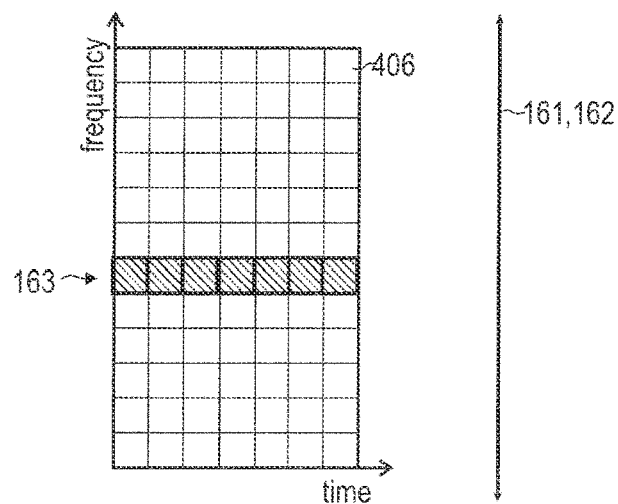
FIG. 1C schematically illustrates a resource mapping comprising allocated radio resources for transmission of data units via the radio link of the cellular network according to various embodiments.

FIG. 1C illustrates aspects with respect to allocating radio resources 406 in in different frequency bands 163. In the example of FIG. 1C, allocating of radio resources 406 in a single carrier, e.g., corresponding to one of the frequency bands 161, 162, is illustrated. In the example of FIG. 1C, the different radio resources 406 correspond to resource elements—e.g., in the case of 3GPP LTE RAT having a bandwidth of 180 kHz and corresponding to a single Orthogonal Frequency Division Multiplex (OFDM) symbol. Resource elements of a given frequency 163 define a sub-carrier of the respective carrier. In the example of FIG. 1C, a certain sub-carrier is selected for allocation of radio resources 406 (illustrated by the dashed filling in FIG. 1C).

FIG. 2 illustrates aspects with respect to a protocol stack 290 implemented by the eNB 112 and the terminal 130 for communication of application transactions and transmission of data units via the radio link 111.

Highest in hierarchy is the application layer 280. While in the example of FIG. 2 a single application as illustrated, it is possible that a plurality of application layers are stacked upon each other. In some examples, the application layer 280 may implement user-interfacing. The application layer 280 may specify protocols and interface methods used by hosts such as the terminal 130 and a server of the backend 140. The application layer 280 may implement applications which rely on application transactions. Examples of applications comprise, but are not limited to: HTTP; File Transfer Protocol (FTP); Telnet; Secure HTTP (SHTTP); and Simple Object Access Protocol (SOAP).

Next in hierarchy is to transport layer 281, sometimes also referred to as network layer. The transport layer implements a network protocol. Typically, the transport layer is independent of the particular transmission medium. An example of the transport layer 281 comprises the Internet layer implementing the Internet protocol (IP), see, e.g., Internet Engineering Task Force (IETF) Request For Changes (RFC) 791 (1981).

The upper layers 280, 281 correspond to layer 3-7 according to the Open Systems Interconnection (OSI)-model. The lower layers 292-295 correspond to layers 1 and 2 according to the OSI-model, i.e., the physical layer and the data link layer. In the example of the 3GPP LTE RAT, layers 1 and 2 are embodied as the Packet Data Convergence Protocol (PDCP) layer 292; the Radio Link Control (RLC) layer 293; the Medium Access Control (MAC) protocol 294; and the physical layer 295.

The physical layer 295 performs digital and analog signal processing for transmission via the radio link 111. The physical layer 295 forms the bottom of the protocol stack 290. Details of the physical layer 295 are described in 3GPP TS 36.211 V.12.8.0 (2015), 36.212 V.12.7.0 (2016), and 36.213 V.12.8.0 (2016).

The MAC layer 294 controls the operation of the physical layer 295 and performs link adaptation and scheduling for transmission via the radio link 111. The MAC layer 294 may thus perform allocation of radio resources 406. Details of the MAC layer 294 are specified in 3GPP TS 36.321, V.12.8.0 (2016).

The RLC layer 293 maintains the data link between 2 devices and, as such, controls operation of the data bearer 150. Details of the RLC layer 293 are specified in 3GPP TS 36.322 V.12.3.0 (2015).

The PDCP layer processes IP datagrams to perform such operations as compression and/or security encryption. Details of the PDCP layer 292 are described in 3GPP TS 36.323 V.12.5.0 (2016).

Figure 3:
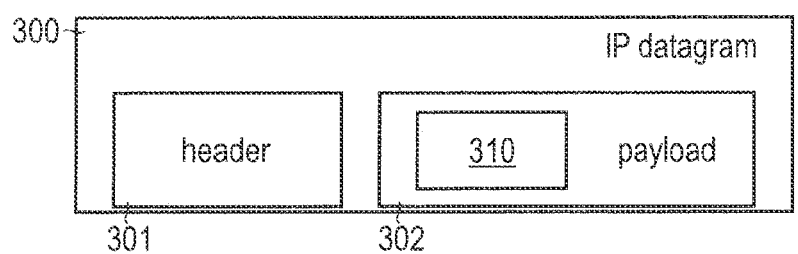
FIG. 3 schematically illustrates a data unit comprising a header section and a payload section according to various embodiments, the payload section comprising an application transaction.

FIG. 3 illustrates aspects with respect to a data unit 300 comprising an application transaction 310 and the payload section 302. In the example of FIG. 3, the data unit 300 is embodied as an IP datagrams. In other examples, the data unit may be embodied by different instances, e.g., by a RLC Packet Data Unit (PDU) in a scenario where the application transaction 310 is identified in the MAC layer 294.

In the example of FIG. 3, the application transaction 310 is comprised in the payload section 302 of a single data unit 300. In other examples, it is possible that due to fragmentation the application transaction 310 is split and distributed across a plurality of data units 300.

The payload section 302 may be encrypted. Encryption may be based on the application layer 280 or transport layer such as the Transport Control Protocol (TCP) layer or an upper part of the IP layer 281. Example encryption protocols comprise: SHTTP; Secure Sockets Layer (SSL); and Transport Layer Security (TLS).

The data unit 300 also comprises a header section 301. In case of the data unit 300 being embodied as the IP datagram, the header section 301 includes: the source IP address; the destination IP address; and a fragment offset. E.g., where the application transaction is distributed across a plurality of IP datagrams, the fragment offset can be indicative of the relationship of the subject IP datagram with respect to a further IP datagrams comprising other fragments of the application transaction.

Figure 4:
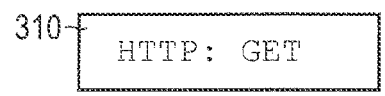
FIG. 4 schematically illustrates the application transaction according to various embodiments.

FIG. 4 illustrates aspects with respect to the application transaction 310. In the example of FIG. 4, the application transaction 310 is an HTTP: GET operation. E.g., in the example of FIG. 4 the application transaction 310 can comprise a request and a response (not illustrated in FIG. 4).

The specific information content of the application transaction is not germane for the functioning of the various embodiments described herein. As such, it is possible that the different implementations of wide variety of different kinds and types of application transactions 310 are employed. It is even possible to employ application transaction 310 which relate to multiple application layers stacked upon each other. An example would be a SOAP operation communicated via the HTTP protocol.

Hereinafter, techniques of controlling allocation of radio resources 406 in response to identifying an application transaction 310 in the payload section 302 of at least one data unit 300 are described. The techniques of controlling resource allocation enable to allocate such radio resources 406 for transmission of the at least one data unit 300 which ensure that connectivity of the application associated with the application transaction 310 meets certain targets.

Figure 5A:
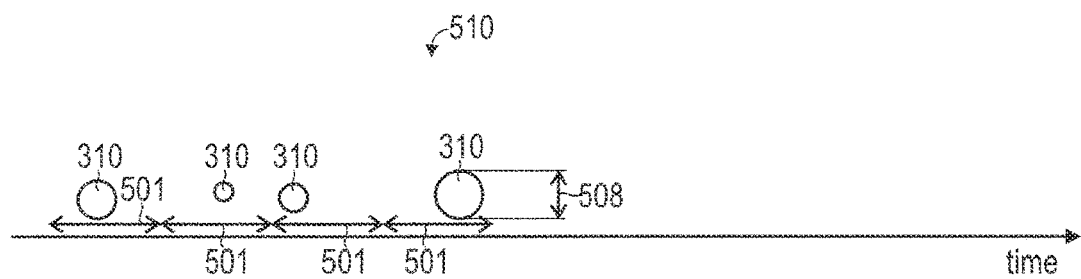
FIG. 5A schematically illustrates a transaction service agreement according to various embodiments, the application transaction specifying a guaranteed number of executed communications of application transactions via the radio link per time unit.

One example of a target for connectivity is a transaction service agreement. FIG. 5A illustrates aspects with respect to a transaction service agreement 500. FIG. 5A plots the application transactions 310 that are required to be communicated via the radio link 111 (candidate application transactions) as a function of time. In the plot of FIG. 5A, each bubble corresponds to a transaction service agreement 310. In the plot of FIG. 5A, the diameter of each bubble corresponds to the data size 508 of the transaction service agreement 310 (e.g., larger bubbles correspond to a larger size).

The transaction service agreement 500 can specify one or more performance characteristics that are guaranteed to a user or subscriber with respect to the communication of application transactions 310. It is possible that the one or more performance characteristics are guaranteed to the user on average. In further examples, it is possible that the one or more performance characteristics are guaranteed to the user per application transaction; in such a scenario, the transaction service agreement 500 may not rely on an on-average definition of the performance characteristics, but guarantee the performance characteristic for each individual application transaction 310. Also, mixed implementations are conceivable where for a first performance characteristic an on-average definition applies, while for a second performance characteristic a per application transaction definition applies.

In various examples, various kinds and types of performance characteristics can be implemented for the transaction service agreement 500. The kind and type of the performance characteristic is not germane for the functioning of the various examples described herein. E.g., the numbers, sizes, latency, and/or success rate of communication of application transactions may be guaranteed.

An example of the performance characteristic is a guaranteed number of executed communications of application transactions 310 via the radio link 111 per time unit. E.g., the performance characteristic may correspond to a guaranteed number of executed communication attempts for application transactions 310, i.e., irrespective of whether the respective communication attempt has been successfully completed or has been acknowledged. In further examples, it is possible that the performance characteristic corresponds to a guaranteed number of successfully completed communications of application transactions 310. Here, a communication of an application transaction 310 may be considered as successfully completed at a point in time where the application transaction 310 is available to the respective application layer 280 of the recipient. Alternatively, the communication of the application transaction 310 may be considered successfully completed at a point in time where receipt of the application transaction 310 is acknowledged. Different definitions of a successfully completed communication of the application transaction 310 may be applicable.

If the transaction service agreement 500 employs an on-average definition for the guaranteed number of executed communications of application transaction 310, then it is possible that for some instances of communicating application transactions 310 the guaranteed number is not met. However, in other examples, it is also possible that the transaction service agreement 500 specifies the time unit 501 (cf. FIG. 5A); such a scenario may correspond to guaranteeing communication of the respective number of application transactions 310 for each and every instance of the time unit 501.

Such a scenario is illustrated in the example of FIG. 5A. In the example of FIG. 5A, a single communication event of an application transaction 310 is guaranteed per time unit 501. Thereby, a time-to-execute can be guaranteed. As can be seen from the example of FIG. 5A, for each instance of the time unit 501, communication of a single application transaction 310 is executed. Thus, in the example of FIG. 5A, communication of the application transactions 310 is in compliance with the transaction service agreement 500.

FIG. 5A illustrates the time unit 501 qualitatively. The quantitative dimensioning of the time unit 501 is not germane for the functioning of the various examples described herein. In the various examples, the quantitative dimensioning of the time unit 501 may widely vary. E.g., in some examples, the time unit 501 may be dimensioned comparably small, e.g., in the order of a couple of milliseconds, tens or hundreds of milliseconds, seconds or minutes. Here, the number of executed communications of application transactions 310 is guaranteed with a comparably fine granularity. In other examples, the time unit 501 may be dimensioned comparably large, e.g., in the order of a couple of minutes, hours, days, or even weeks. Here, the number of executed communications of application transactions 310 is guaranteed with a comparably coarse granularity.

E.g., an example of an transaction service agreement would be to guarantee communication of an application transaction having a size of up to 100 kB within a time duration of 0.5 seconds at a 99.999% likelihood; this corresponds to an on-average definition. This example corresponds to the concept of defining the time unit, i.e., requiring that the data bearer 150 provides a data rate of 1600 Kbps per 0.5 seconds. This is different to providing an on-average data rate of 800 Kbps (average data rate if one transaction per second are communicated) or 3,200 Kbps (average data rate if 2 transactions per second are communicated), i.e., without specifying the time unit. Thus, in general, the transaction service agreement may specify x bytes of data within a time period y.

E.g., a further example of a transaction agreement would be to guarantee that communication of an application transaction of 100 kB in size does not require more than 0.5 seconds. E.g., a further example of a transaction agreement would be to guarantee that the communication of an application transaction of variable size—e.g., with a maximum size constraint being specified—does not require more than 0.6 seconds. Such time durations are examples only and may vary in different implementations.

Different implementations of the transaction service agreements may be classified into QoS classes. E.g., different classes of transaction service agreements may correspond to a different guaranteed number of executed communications, different time units, or different constraints specified by the transaction service agreement 500. Thus, properties of different transaction service agreements may be pre-provisioned, e.g., in parameterized form.

FIG. 5A further illustrates aspects with respect to constraints specified by the transaction service agreement 500. It is possible that the transaction service agreement 500 specifies one or more constraints which are to be met by candidate application transactions 310 in order to be eligible for communication under the transaction service agreement 500. If an individual application transaction 310 and/or an ensemble of a plurality of application transactions 310 does not meet one or more respective constraints, it is possible that communication of the respective application transaction 310 and/or the respective plurality of application transactions 310 is not subject to the transaction service agreement 500; then, the communication of the application transaction 310 and/or the plurality of application transactions 310 is not required to be in compliance with the transaction service agreement 500.

The kind and type of the one or more constraints specified by the transaction service agreement 500 is not germane for the functioning of the various examples described herein. Thus, various examples can rely on a wide variety of different kinds and types of constraints. Constraints may, e.g., relate to the number, size, frequency of occurrence, and/or content of transaction service agreements.

One example of a constraint that may be specified by the transaction service agreement 500 is a size constraint. From FIG. 5A it is apparent that there may be a distribution of sizes 508 of the candidate application transactions 310. It is possible that the transaction service agreement 500 specifies a size constraint for candidate application transactions 310. E.g., the size constraint could specify a maximum size that cannot be exceeded by individual application transactions 310 for which the candidate transaction service agreement 500 is to be applicable. E.g., the size constraint could specify a size distribution that needs to be met by an ensemble of a plurality of candidate application transactions 310 for which the transaction service agreement 500 is to be applicable. E.g., the size constraint could specify a maximum size and/or a size distribution in terms of bytes.

A further example of a constraint that may be specified by the transaction service agreement 500 is a timing constraint. From FIG. 5A it is apparent that the application transactions 310 occur as a bunched set 510; the bunched set 510 comprises an immediate repetition of a plurality of application transactions 310. E.g., such an immediate repetition of a plurality of application transactions 310 may be present where a plurality of candidate application transactions 310 are queued for communication via the radio link 111 during a time duration residing on the a timescale which is in the same order of magnitude as the time unit 501. In some examples, the timing constraint 502 could specify a minimum duration between subsequent bunched sets.

Figure 5B:
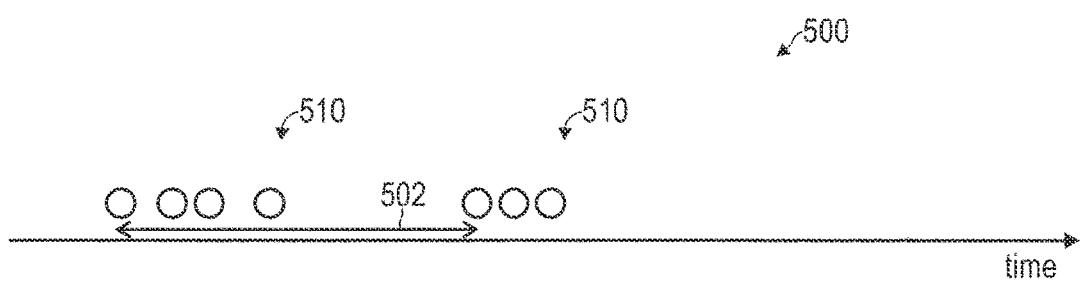
FIG. 5B schematically illustrates a number constraint for candidate application transactions specified by the transaction service agreement according to various embodiments.

FIG. 5B illustrates aspects with respect to the transaction service agreement 500 specifying the timing constraint 502 for candidate application transactions 310. In the example of FIG. 5B the time duration 502 between subsequent bunched set 510 according to a timing constraint is illustrated. Different actions may be taken if the candidate application transactions 310 do not fulfill the timing constraint. E.g., communication of excess application transactions 310 may be delayed or communication of excess application transactions 310 may be executed without ensuring compliance with the transaction service agreement 500.

In the example of FIG. 5B, two bunched sets 510 of candidate application transactions 310 are queued for communication via the radio link 111. Here, it is possible that the maximum number of candidate application transactions 310 per bunched set 510 is specified by a number constraint. If the number of candidate application transactions 310 of a bunched set 510 exceeds that maximum number it is possible that all or excess candidate application transactions 310 are not eligible for communication under the transaction service agreement 500.

As can be seen, a wide variety of different kinds and types of constraints may be specified by the transaction service agreement 500. Examples include the above-described size constraint, timing constraint, and number constraint. In the various examples, it is possible that the constraints define a hard limit or a soft limit. A hard limit may prevent an excess candidate application transaction 310 not fulfilling the respective constraint to be eligible for communication under the transaction service agreement 500 under any circumstance. A soft limit may correspond to an overusage criterion for temporarily breaching the constraint. Here, under certain circumstances defined by the overusage criterion the excess candidate application transaction 310 may not fulfill the respective constraint, but be eligible for communication under the transaction service agreement 500 nonetheless. E.g., the overusage criterion may specify a certain fraction or percentage of candidate application transactions 310 that can be communicated under the transaction service agreement 500 even though they violate one or more constraints. E.g., the overusage criterion may specify a tolerance of communicating candidate application transactions 310 which violate one or more constraints under the transaction service agreement 500.

With respect to FIGS. 5A and 5B, performance characteristics guaranteed by the transaction service agreement 500 and constraints specified by the transaction service agreement 500 have been discussed. In some examples, it is possible that the transaction service agreement 500 statically specifies at least some of the performance characteristics and/or at least some of the constraints; i.e., it is possible that the transaction service agreement 500 does not specify a time-dependency of the at least some of the performance characteristics and/or the at least some of the constraints. In further examples, it is possible that the transaction service agreement 500 specifies a time-dependency for at least some of the performance characteristics and/or for at least some of the constraints.

Figure 6:
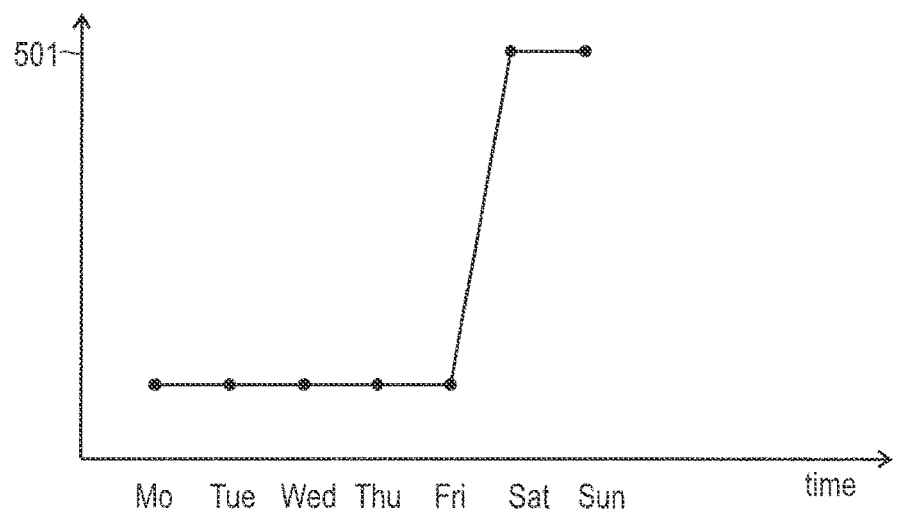
FIG. 6 schematically illustrates a dependency of the time unit of the transaction service agreement of FIG. 5A on the day of the week.

FIG. 6 illustrates aspects with respect to time-dependency of the time unit 501; this is an illustrative example of the time-dependency of a property of the transaction service agreement 500, but similar techniques may be readily applied to other properties of the transaction service agreement 500.

As can be seen, in the example of FIG. 6, the time unit 501 is dimensioned smaller for weekdays and larger for Saturdays and Sundays. At the same time, it is assumed that the guaranteed number of executed communications of application transactions 310 is specified by the transaction service agreement 500 remains constant: This results in the transaction service agreement guaranteeing a larger number of executed communications of application transactions 310 per time on weekdays if compared to Saturdays and Sundays.

While in the example of FIG. 6 the time-dependency of the time unit 501/the guaranteed number of executed communications of application transactions 310 is illustrated, in other examples it is possible that other performance characteristics guaranteed by the transaction service agreement 500 and/or constraints specified by the transaction service agreement 500 exhibit a respective time-dependency.

In the example of FIG. 6, the time-dependency is implemented on a granularity of days. However, in other examples, a finer or coarser granularity may be implemented for the time-dependency. E.g., a time-dependency on the timescale of a couple of milliseconds, tenths of milliseconds, hundreds of milliseconds, seconds, minutes, hours, weeks, or months could be implemented. It is also possible to implement various qualitative dependencies. E.g., the time unit 501 may be dimensioned with respect to the transaction time associated with the respective application transaction 310.

In the various examples, allocation of radio resources 406 for transmission of at least one data unit 300 comprising an application transaction 310 in the payload section thereof is controlled. Such control of the allocation can be for compliance of the communication of the application transaction 310 with the transaction service agreement 500.

Figure 7:
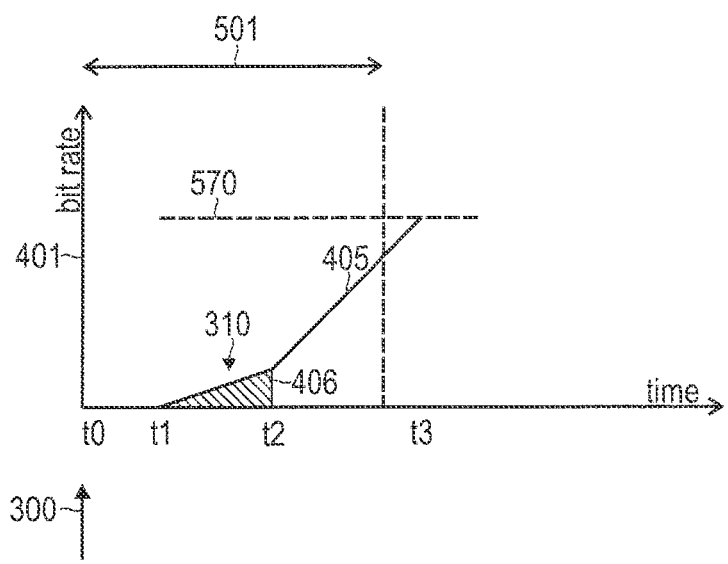
FIG. 7 schematically illustrates scheduling for a shared channel of the radio link according to various embodiments, the shared channel comprising the radio resources used for transmission of data units.

FIG. 7 illustrates aspects of controlling allocation of radio resources 406 for transmission of the at least one data unit 300. In the example of FIG. 7 the bit rate 401 dedicated on a shared channel to the transmission of data units 300 associated with a certain subscriber is plotted as a function of time.

t0 marks the point in time at which the data unit 300 comprising the application transaction 310 is queued for transmission, e.g., arrives at a transmission buffer. As can be seen, only at a point in time t1 the bit rate 401 starts to increase, first slowly until t2 and then faster between t2 and t3. The latency t0-t1, as well as the slope of the bit rate curve may be due to limits imposed by link adaptation and/or scheduling. Examples include the requirement to transmit a DL assignment and/or an UL grant, freeing resources otherwise occupied, time to execute control signaling, lead time to modify the data bearer, ramp-up time of internal processing, TCP opening window negotiation, processing delays, constraints imposed by a transmission service agreement, etc.

t3 corresponds to the point in time at which the time unit 501 ends: it is thus guaranteed by the transaction service agreement 500 that communication of the application transaction 310 is completed by t3. In the example of FIG. 7, not all available resources between t0 and t3 are used for transmission of the at least one data unit 300 comprising the application transaction 310; only a fraction of all available radio resources 406 is used (illustrated by the dashed filling in FIG. 7), because of the finite size of the at least one data unit 300. Within the available radio resources 406, transmission of the at least one data unit 300 comprising the application transaction 310 is prioritized over further traffic. This allows to execute communication of the application transaction 310 comprised in the at least one data unit 300 before expiry of the time unit 501. Controlling of the allocation of the radio resources can thus take into account the size of the at least one data unit 300.

Because communication of the application transaction 310 comprised in the at least one data unit 300 is executed before expiry of the time unit 501, in the example of FIG. 7 it is not required to actively adjust link adaptation and/or scheduling for the shared channel of the radio link 111. Rather, controlling of allocation of the radio resources 406 in the example of FIG. 7 may be restricted to monitoring link adaptation and/or scheduling for the shared channel of the radio link 111; said monitoring yields that scheduling—according to reference implementations and/or based on a transmission service agreement 151—already allows for communication of the application transaction 310 in compliance with the transaction service agreement 500. Thereby, beyond such passively monitoring there is no need to actively interfere with the link adaptation and/or scheduling performed based on the transmission service agreement 151, e.g., by actively allocating the radio resources 406 for compliance with the transaction service agreement 500. Said monitoring may take into account the size of the at least one data unit 310. E.g., said monitoring may compare the size of the at least one data unit 300 with a throughput estimate that can be derived from operating properties of scheduling and/or link adaptation, e.g., from the transmission service agreement 151.

Figure 8A:
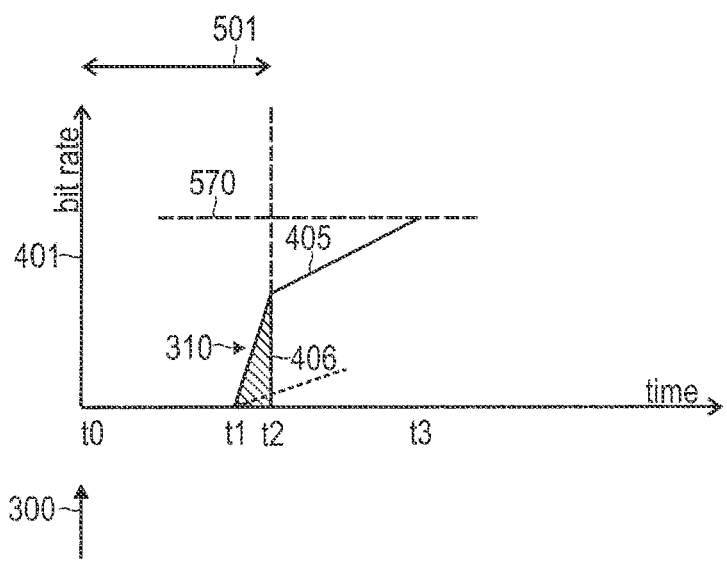
FIG. 8A schematically illustrates scheduling for a shared channel of the radio link according to various embodiments, the shared channel comprising the radio resources used for transmission of data units.

FIG. 8A illustrates aspects of controlling allocation of radio resources 406 for transmission of the at least one data unit 300. FIG. 8A generally corresponds to the scenario of FIG. 7. However, from a comparison of FIGS. 7 and 8A, two points are apparent: first, the latency t0-t1 is longer for the scenario of FIG. 8A if compared to the scenario of FIG. 7; second, the time unit 501 is dimensioned shorter for the scenario of FIG. 8A if compared to the scenario of FIG. 7.

Conventional link adaptation and/or scheduling—e.g., in conformity with a transmission service agreement 151—would result in a breach of the transaction service agreement 500 (in FIG. 8A, the conventional inclination of the bit rate 401 starting from t1 is illustrated by the dotted line). This can be identified by monitoring link adaptation and/or scheduling; here, the size of the at least one data unit 300 can be compared with a throughput estimate that takes into account the latency t0-t1 and the typical increase of the bit rate 401 starting from to, e.g., based on the transmission service agreement 151.

Because of this finding, link adaptation and/or scheduling are actively adjusted based on the transaction service agreement. This comprises allocating the radio resources 406 based on the specified time unit 501. As can be seen from a comparison of FIGS. 8A and 7, by allocating the radio resources 406 based on the specified time unit 501, a faster increase in the bit rate 401 starting from the point in time t1 is achieved; this allows to execute communication of the application transaction 310 comprised in the at least one data unit 300 before expiry of the time unit 501 (illustrated by the dashed filling in FIG. 8A).

Figure 8B:
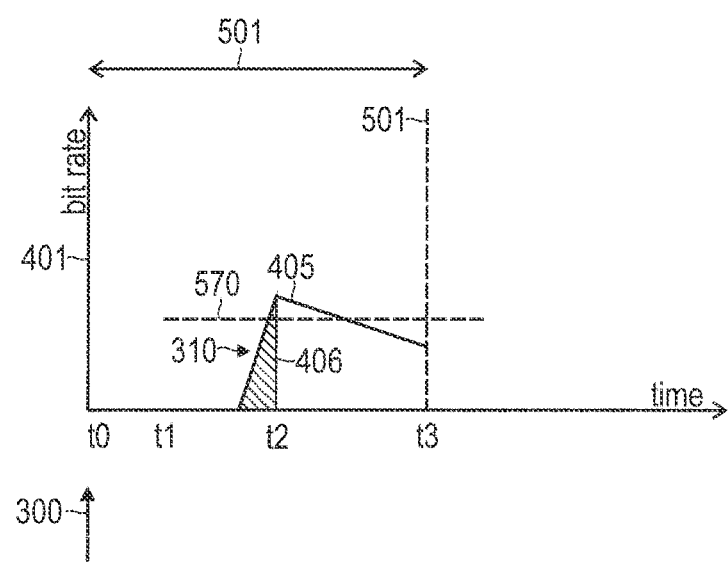
FIG. 8B schematically illustrates scheduling for a shared channel of the radio link according to various embodiments, the shared channel comprising the radio resources used for transmission of data units.

FIG. 8B illustrates aspects of controlling allocation of radio resources 406 for transmission of the at least one data unit 300. FIG. 8B generally corresponds to the scenario of FIG. 8A. However, from a comparison of FIGS. 8A and 8B, it is apparent that a bit rate constraint 570 of the transmission service agreement 151 (illustrated by the horizontal dashed line) affects the possibility of executing communication of the application transaction 310 comprised in the at least one data unit 300 prior to expiry of the time unit 501. The bit rate constraint 570 specifies a maximum allowed bit rate 401 that can be assigned to the terminal 130/the respective subscriber as part of scheduling. E.g., the bit rate constraint 570 may ensure balanced traffic between a plurality of terminals sharing the radio resources on the shared channel.

Generally, it is possible that said controlling of allocation of the radio resources 406 depends on, both, the size of the at least one data unit 300 comprising the application transaction 310, as well as on the bit rate constraint 570. E.g., said monitoring of scheduling and/or link adaptation may be based on the size of the at least one data unit 300 comprising the application transaction 310 and the bit rate constraint 570. By considering, both, the size of the at least one data unit 300, as well as the bit rate constraint 570, it is possible to accurately predict whether communication of the application transaction 310 can be executed in compliance with the transaction service agreement 500.

Referring again to the example of FIG. 8B: here, it is not possible to execute communication of the application transaction 310 in compliance with the transaction service agreement 500, i.e., before expiry of the time unit 501, if the bit rate constraint 570 is treated as a hard limit. In the example of FIG. 8B, the bit rate constraint 570 is breached. Breaching is exceptionally allowed, because a traffic load on the shared channel of the radio link 111 which comprises the radio resources 406 is comparably low, i.e., below a certain threshold. Because the traffic load is comparably low, temporarily breaching the bit rate constraint 570 does not result in drawbacks for further subscribers accessing the shared radio resources on the shared channel. On the other hand, communication of the application transaction 310 can be executed in compliance with the transaction service agreement 500.

In the example of FIG. 8B, said controlling of allocation of the radio resources 406 takes into account the bit rate constraint 570 imposed by the transmission service agreement 151. In further examples, it is also possible to take into account further or other constraints specified by the transmission service agreement 151, e.g., a size constraint or the timing constraint.

In still further examples, it is possible that the transaction service agreement 500 overrules at least some constraints specified by the transmission service agreement 151 by default. In such a scenario, it is possible that the allocating the radio resources 406 for compliance of the communication of the application transaction 310 with the transaction service agreement 500 does not take into account the transmission service agreement 151.

With respect to FIGS. 7, 8A, 8B, examples have been described where the time-domain behavior of resource allocation is controlled. Alternatively or additionally to such examples, it is also possible to control the frequency-domain behavior of resource allocation. E.g., where there is a plurality of candidate frequency bands 161, 162, 163 available for allocation of radio resources, it is possible to select at least one frequency band from the plurality of candidate frequency bands 161, 162, 163 for allocation of the radio resources that are used for transmission of the at least one data unit comprising the application transaction. When selecting the at least one frequency band 161, 162, 163 for allocation of the radio resources, different considerations may be taken into account. E.g., different frequency bands may be associated with performance characteristics. In some examples, it is possible to select at least one frequency band from the plurality of candidate frequency bands which is associated with a high performance characteristic for allocation of the radio resources. By selecting the frequency bands 161, 162, 163, it becomes possible to ensure communication of the application transaction 310 in compliance with the transaction service agreement 500. Further, traffic balancing may be achieved, avoiding negative implications on further terminals and/or subscribers.

In some examples, one of the frequency bands 161, 162, 163 may be dedicated to the communication of application transactions. I.e., in some examples, one of the frequency band 161, 162, 163 may be reserved for transmission of such data units which comprise an application transaction in their payload section. Then, it is possible to select the at least one frequency band for allocation of the radio resources which is dedicated to the communication of application transactions. By implementing a dedicated frequency band 161, 162, 163 for communication of application transactions, it is possible to assign communication of application transactions with a high priority. Thereby, connectivity of the application associated with the application transactions can be provided with a high QoS.

In other examples, it is also possible that the different frequency bands 161, 162 are not dedicated to the communication of application transactions. I.e., in some examples it is possible that transmission of data units comprising, both, application transactions and other payload data in the respective payload sections is implemented on each one of the available frequency bands 161, 162, 163. In particular, such an implementation can be feasible where CA is not implemented and a single frequency band is available for transmission of data units.

Summarizing, examples are described which enable to control allocation of the radio resources 406 for transmission of the at least one data unit 300 for compliance of the communication of the application transaction 310 with the transaction service agreement; in the examples, this can be achieved by monitoring scheduling and/or link adaptation based on a transmission service agreement 151 and, if necessary, actively overriding scheduling and/or link adaptation by allocating the radio resources 406 based on the specified time unit 501 and the bit rate constraint 570. Thereby, a trade-off between conventional scheduling and/or link adaptation and compliance with the transaction service agreement 500 can be achieved.

In a scenario where the radio resources 406 are actively allocated, different strategies are conceivable for ensuring compliance with the transaction service agreement 500. An example is locally optimizing the allocation of the radio resources 406 for the at least one data unit 300 based on the specified time unit 501 and the bit rate constraint 570. A local optimization can correspond to an optimization with respect to compliance with the transaction service agreement 500 for each instance of an application transaction 310. In other words, the local optimization can be different to an on-average compliance with the transaction service agreement 500 where only over an ensemble of application transactions 310 compliance is achieved, i.e., on average. In particular, the local optimization may be independent of transmission of further subscribers/terminals in shared radio resources. By such techniques of local optimization, it is possible to facilitate compliance with the transaction service agreement 500 for every application transaction 310. In particular, buffer resources can be pro-actively allocated to facilitate this compliance. Thereby, it is possible to hedge against unpredictable events that cannot be easily compensated for such as a large amount of high priority traffic, a large number of terminals temporarily roaming to the eNB 112, connectivity cuts of the eNB 112, antenna failures, etc.

Figure 9:
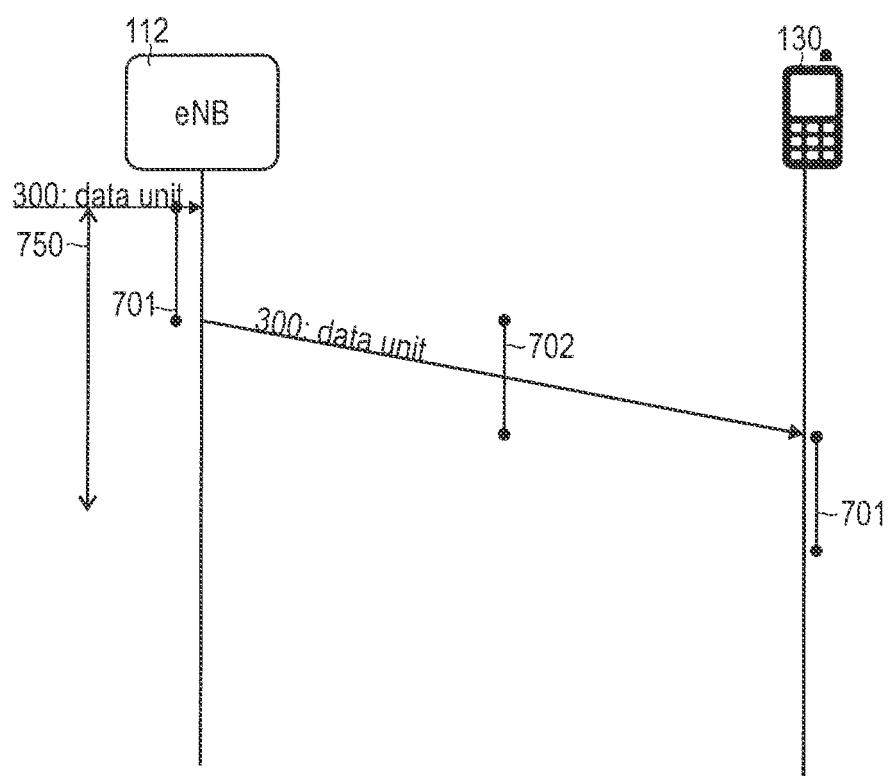
FIG. 9 is a signaling diagram schematically illustrating processing delays and a transmission time for transmission of data units via the radio link according to various embodiments.

FIG. 9 is a signaling diagram illustrating aspects with respect to transmission of at least one data unit 300. First, the at least one data unit 300 arrives at the eNB 112, e.g., from the SGW 117 along the bearer 150. After a certain processing delay 701, the eNB 112 transmits the at least one data unit. Transmission of the at least one data unit 300 require a certain duration 702 due to propagation delay. The at least one data unit 300 is received by the terminal 130; after a certain processing delay 701, the application transaction 310 comprised in the at least one data unit 300 is available to the application layer 280.

The overall latency 750 is thus a sum of processing delays 701 and the propagation delay 702. The overall latency 750 and/or individual latencies 701, 702 can be taken into account when controlling the allocation of the radio resources 406 for compliance of the communication of the application transaction 310 with the transaction service agreement 500. In particular, in a scenario where the transaction service agreement 500 specifies a guaranteed number of successfully completed communications of application transactions 310 via the radio link 111 per time unit 501, the overall latency 750 can be taken into account. E.g., making reference to the FIGS. 7, 8A, 8B, when allocating the radio resources 406 and/or when monitoring scheduling and/or link adaptation, a time offset corresponding to the overall latency 750 can be considered. By considering the latency 701, 702, 750, a more accurate transaction service agreement 500 can be defined specifying the guaranteed number of successfully completed communications of application transactions 310 per time unit 501.

Figure 10:
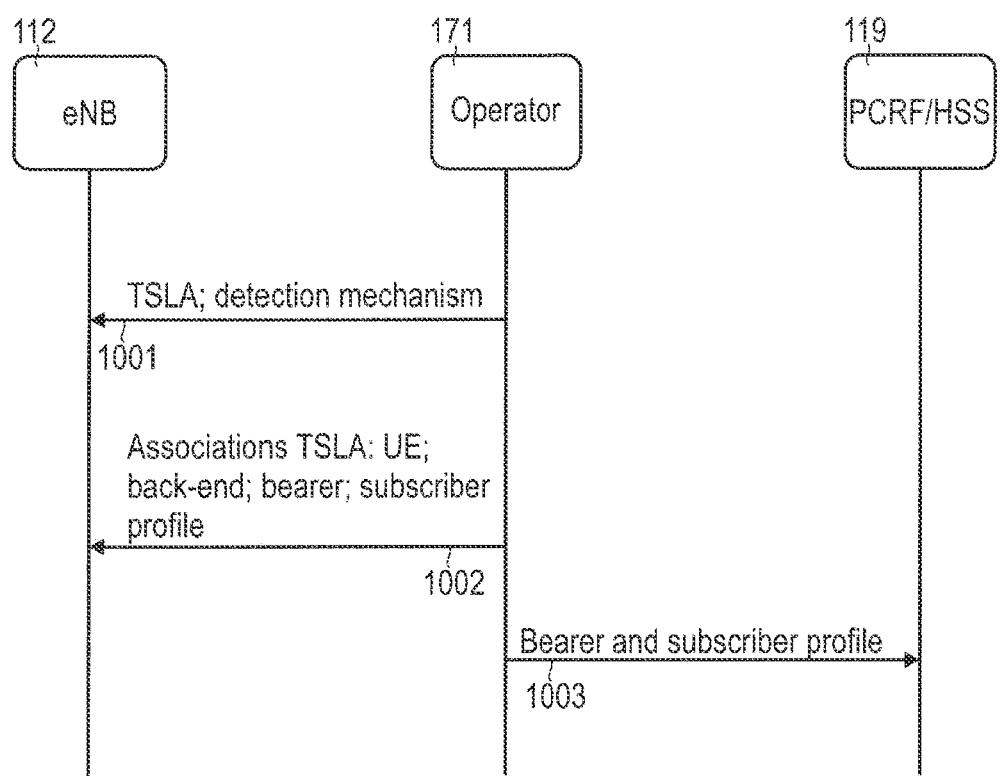
FIG. 10 is a signaling diagram schematically illustrating provisioning of a transaction service agreement at a radio access node according to various embodiments.

FIG. 10 is a signaling diagram illustrating aspects with respect to provisioning the transaction service agreement 500 at the eNB 112.

Control message 1001: the control message 1001 includes operational properties of the transaction service agreement 500, e.g., comprising elements selected from the group comprising: performance characteristics; constraints; time dependencies of performance characteristics and/or constraints; detection scheme. By means of the control message 1001 the operator defines the transaction service agreement 500 or a plurality of transaction service agreements 500 that shall be supported by the cellular network 100. The eNB 112 is informed accordingly by means of the control message 1001.

It is possible that the control message 1001 optionally comprises information on the techniques used for identifying application transactions comprised in payload sections of data units, i.e., the detection scheme. E.g., where a plurality of transaction service agreements are supported by the network, each transaction service agreement may be associated with one or more detection schemes.

Where transaction service agreements are to be implemented in the plurality of eNBs (in FIG. 10 only a single eNB 112 is illustrated) it is possible that different transaction service agreements are implemented in different eNBs. It is also possible that the type of detection scheme differs for different eNBs. E.g., an eNB installed in a factory may have a different transaction service agreement 500 implemented if compared to an eNB belonging to a macro network. Likewise, in eNB installed in a factory may have a different detection scheme implemented if compared to an eNB belonging to a macro network.

Control message 1002: the operator ties each transaction service agreement 500 to a provisioning mechanism. The control message 1002 is indicative of the provisioning mechanism. The provisioning mechanism allows the eNB 112 to detect whether a respective terminal registering to the eNB 112 is subject to a specific transaction service agreement. E.g., at 1002, a respective control message may indicate value selected from the group comprising: terminal IP address; backend IP address; bearer ID; and/or subscriber identification such as International Mobile Subscriber Identity (IMSI) or International Mobile Station Equipment Identity (IMEI); etc. E.g., identifying of the application transaction 310 may be selectively executed depending on at least one of the identification of the bearer 150 associated with a subscriber and used for transmitting the at least one data unit 300 and an identification of the subscriber. E.g., where the bearer ID of the bearer 150 corresponds to the bearer ID specified by the provisioning mechanism indicated by the control message 1002, it can be judged that the subscriber or terminal 130 is generally eligible for a transaction service agreement 500. E.g., where the IMSI or IMEI of the terminal 130 corresponds to the IMSI or IMEI specified by the provisioning mechanism indicated by the control message 1002, it can be judged that the subscriber or terminal 130 is generally eligible for a transaction service agreement 500.

Control message 1003: the operator provisions the bearer and subscriber profiles subject to a transaction service agreement 500 to the PCRF 119. 1003 is optional. Here, it is possible to tie the transaction service agreement 500 to a bearer or subscriber profile. Thereby, provisioning of the transaction service agreement 500 to the respective eNB by the PCRF 119 and/or a Home Subscriber Server (HSS) is possible in case of future (re-)attachments of the terminal 130.

Figure 11:
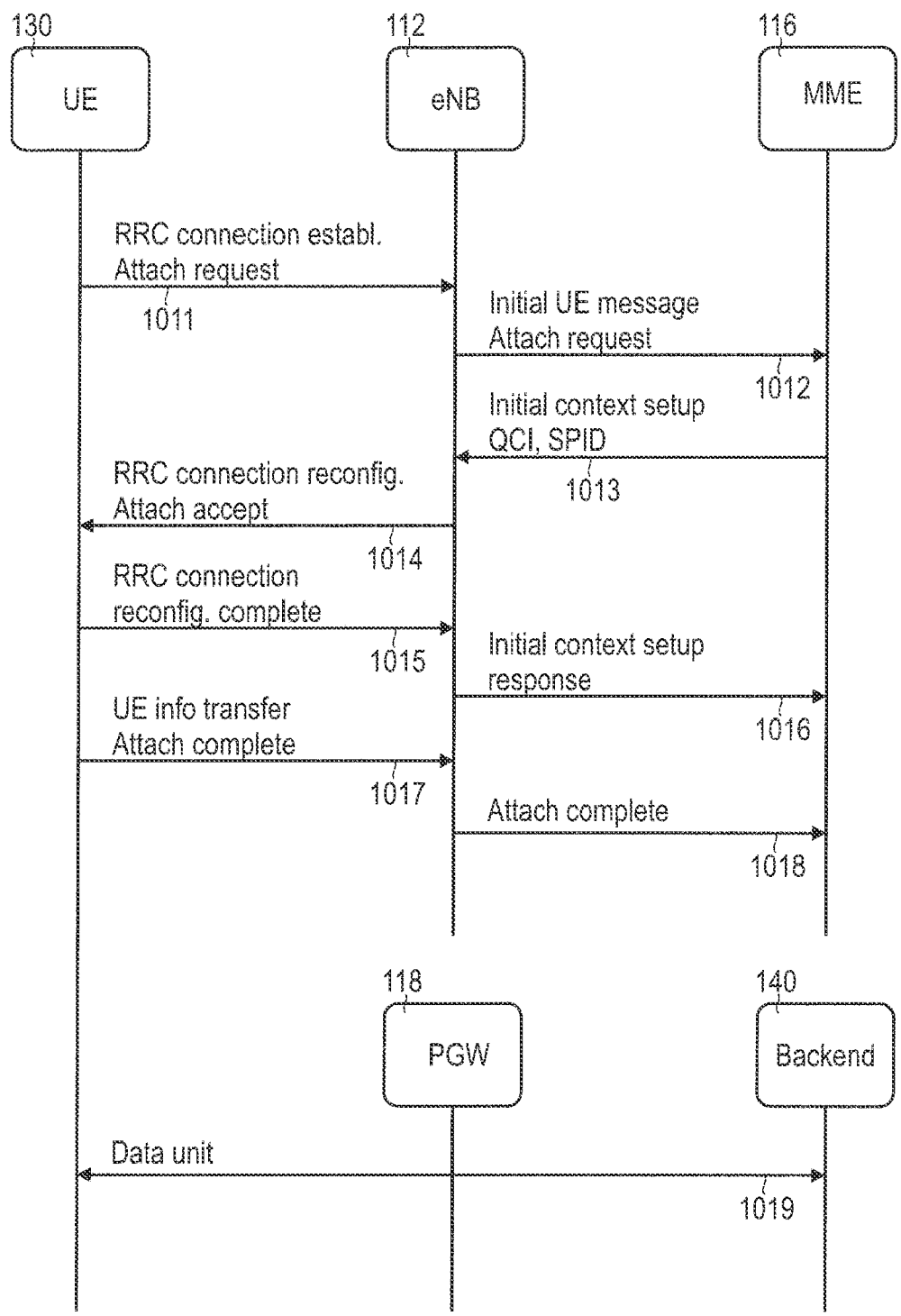
FIG. 11 is a signaling diagram schematically illustrating an attach procedure of a terminal at the radio access node according to various embodiments.

FIG. 11 is a signaling diagram illustrating aspects with respect to establishing the data bearer 150.

Control messages 1011, 1012: the terminal 130 initiates registration with the network 100. Here, the terminal 130 requests attachment, e.g., as part of the random access procedure or a RRC connection establishment procedure (attach procedure). The eNB 112 forwards this request to the MME 116. The MME 116 informs other parts of the operator's network (not shown in FIG. 11) about the registration attempt of the terminal 130. At this stage of the process, the eNB 112 is unaware whether the terminal 130 has capabilities of communicating application transactions and/or whether the terminal 130 is eligible for communication under a transaction service agreement.

Control message 1013: the MME 116 requests the eNB 112 to attach the terminal 130 to the network 100. A corresponding control message may include an indication of the bearer 150, e.g., the bearer ID, and the subscriber profile indicated by the subscriber profile ID (SPID) to be used for the connection. The eNB 112 inspects the bearer and subscriber profile based on the information received at 1002. If the eNB 112 judges that the bearer and subscriber profile are associated with a transaction service agreement according to the provisioning mechanism, the eNB 112 marks that the traffic to and from the terminal 130 on the corresponding bearer is to be handled according to the respective transaction service agreement.

Control messages 1014, 1015: the eNB 112 then establishes the bearers required to support the QCI and informs the terminal 130 that the attach request has been accepted. The terminal 130 confirms this.

Control messages 1016-1018: the eNB 112 informs the MME 116 that the bearer has been established and that the terminal 130 has completed the attach procedure.

Transmission 1019: it is then possible for the terminal 130 to transmit data units 150 towards the backend 140 and receive data units 150 from the backend 140. Transmission of data units 150 is via the PGW 118 (cf. FIG. 1A) and along the data bearer 150. The eNB 112 is configured to identify application transactions comprised in payload sections of the data units. This identifying is in conformity with the detection mechanism that is associated with the respective transaction service agreement. E.g., depending on the particular detection mechanism, the eNB 112 may use DPI and/or SPI to determine if the IP address of the backend 140 in combination with the IP address of the terminal 130 are associated with the transaction service agreement. In the affirmative, the eNB 112 can control allocation of radio resources 406 for transmission of the respective data units 300 on the radio link 111. The eNB 112 may mark that the respective traffic shall be handled according to the transaction service agreement.

Figure 12:
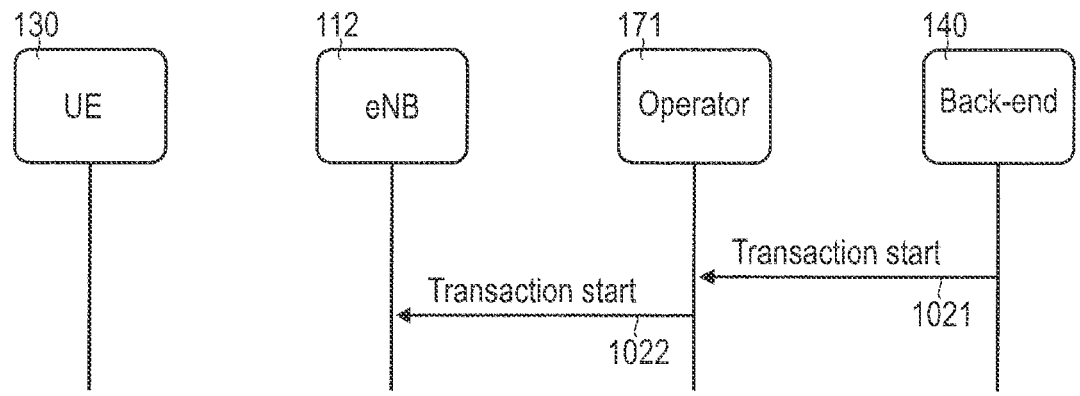
FIG. 12 is a signaling diagram schematically illustrating identifying an application transaction comprised in a payload section of a data unit based on receiving a control message comprising an indicator indicative of the at least one data unit according to various embodiments.

FIG. 12 illustrates aspects with respect to identifying the application transaction 310 comprised in the payload section 302 of at least one data unit 300. In the example of FIG. 12, explicit control signaling indicates the start of a transaction. In detail, at 1021, the transaction backend 140 informs the operator 171 that a transaction is about to start. At 1022, the operator 171 informs the eNB 112 about the upcoming transaction. E.g., a control message of 1022 may be implemented on the O&M interface. The O&M interface can be an interface used for administrative procedures. The O&M interface can be separated from the data plane and control plane interfaces, i.e., S1-U and S1-C for 3GPP LTE. The O&M interface may be flexibly specified in order to implement 1022. The control message 1022 is indicative of the at least one data unit 300. E.g., the control message 1022 may include a sequence number of fragment number etc. of the at least one data unit 300. Thereby, the eNB 112 can identify the application transaction 310.

Figure 13:
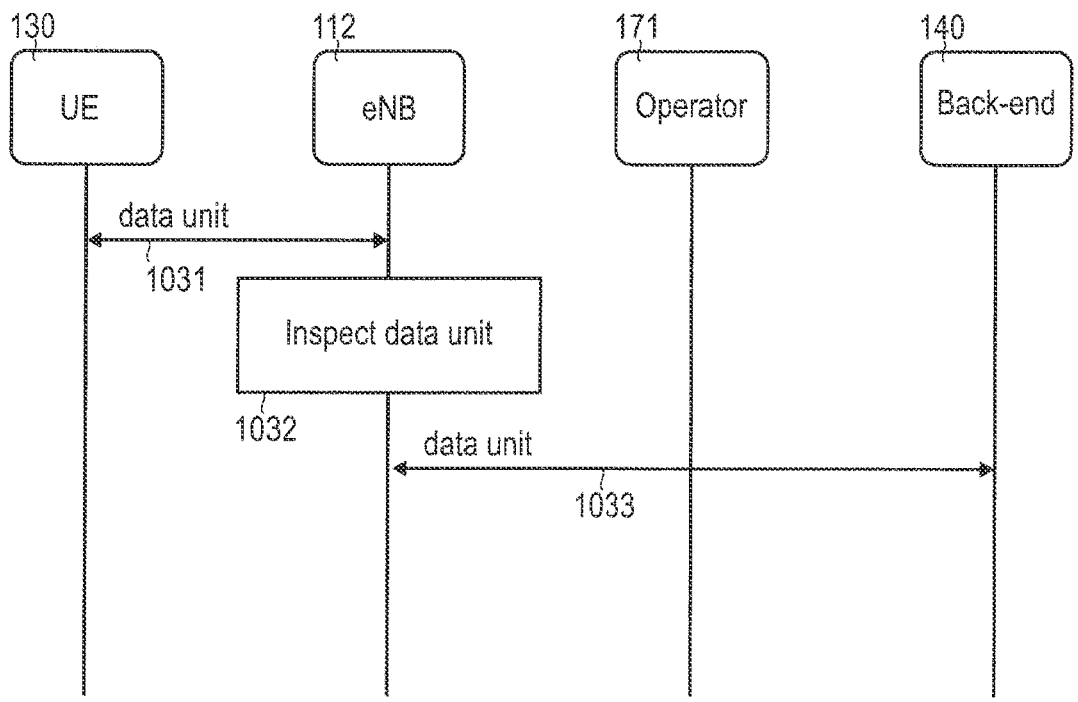
FIG. 13 is a signaling diagram schematically illustrating identifying an application transaction comprised in a payload section of a data unit based on inspecting at least one of a header section of the at least one data unit and the payload section of the at least one data unit according to various embodiments.

FIG. 13 illustrates aspects with respect to identifying the application transaction 310 comprised in the payload section 302 of at least one data unit 300. In the example of FIG. 13, packet inspection is employed in order to identify the application transaction 310. A corresponding data unit is communicated as part of the transmission 1031. At 1032, the eNB 112 performs packet inspection in order to identify the application transaction 310 comprised in the payload section 302 of the data unit communicated as part of 1031, e.g., DPI and/or SPI. The eNB 112 inspects at least one of the header section 301 and the payload section 302 of the at least one data unit 300. Here, the eNB 112 may detect a trigger pattern as a fingerprint of the application transaction 310 and the payload section. The type of trigger pattern used can be part of the definition of the transaction service agreement 500 and may be provisioned as part of the detection scheme. An example of a trigger pattern is receiving a single new byte on an UL channel from the terminal 130 or the backend 140 opening a new TCP connection.

Inspection of the data unit 1032 may also be with respect to in-line control signaling: in particular, the backend 140 and/or the terminal 130 may use explicit signals for control signaling on the application layer 280. Such signals may be intercepted by the eNB 112. When such in-line control signaling is detected, this may allow to identify the application transaction 310 which is about to be communicated. The type of the in-line control signaling can be part of the transaction service agreement definition. The type of the in-line control signaling may be provisioned as part of the detection scheme.

In the scenario of FIG. 13, it is possible that the transmission 1031 is an uplink transmission form the terminal 130 to the eNB 112. Here, it is possible that a first part of the application transaction, e.g., a first data unit, is identified at 1032 only after its transmission at 1031, e.g., by employing DPI and/or SPI. Based on this, allocation of radio resources for further parts of the application transaction e.g., a second data unit, can be controlled. E.g., the first part can correspond to a request message, while the second part can correspond to a response message.

Figure 14:
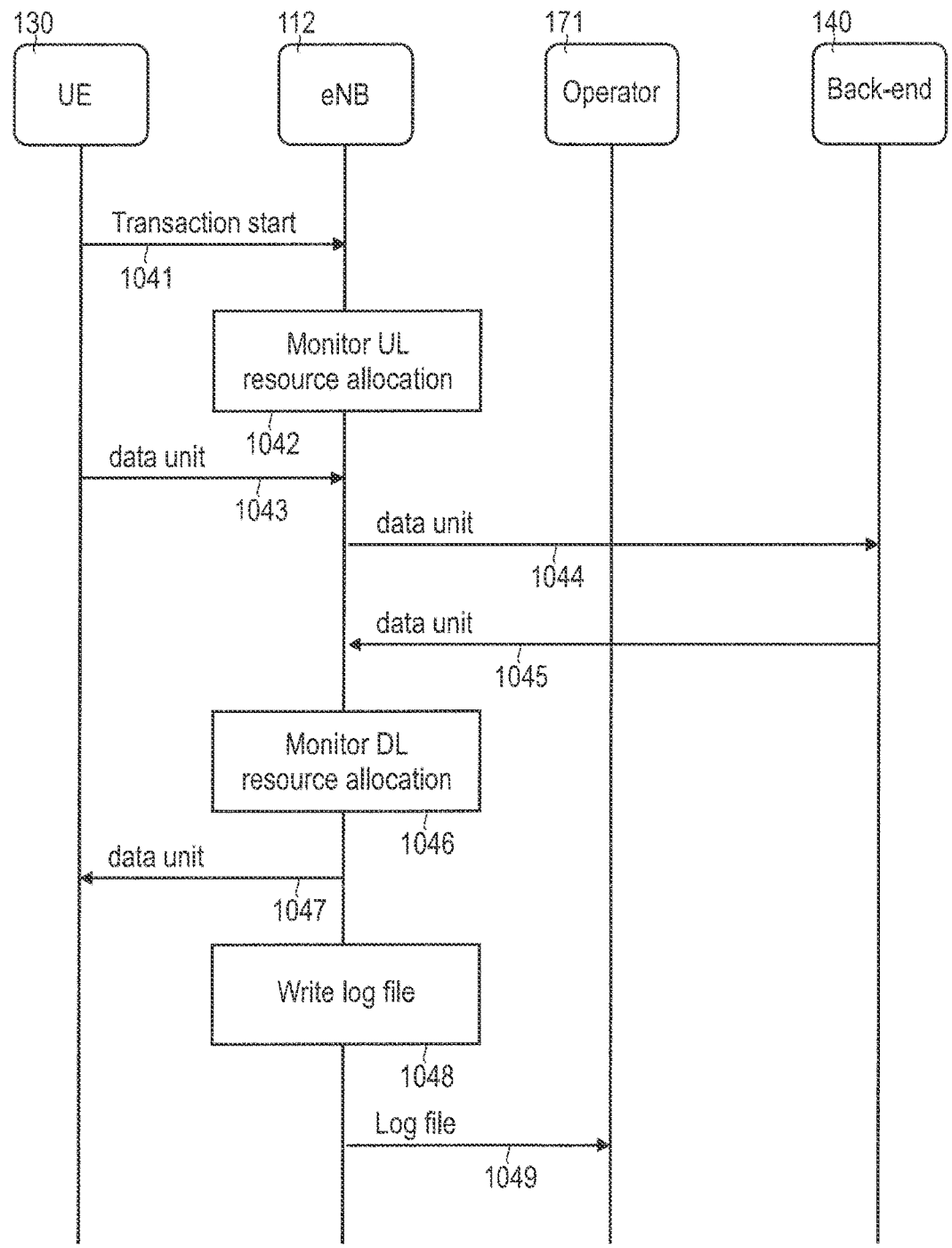
FIG. 14 is a signaling diagram schematically illustrating controlling allocation of radio resources for transmission of a data unit on the radio link in response to identifying an application transaction comprised in the payload section of the data unit according to various embodiments.

FIG. 14 illustrates aspects with respect to supervision of communication of the application transaction.

Control message 1041 is indicative of at least one data unit 300 comprising an application transaction 310. Here, the terminal 130 indicates the upcoming communication of an application transaction 310 to the eNB 112. E.g., the control message 1041 may comprise explicit control signaling which includes a trigger pattern used by the eNB 112 when identifying the application transaction 310. E.g., the control message 1041 may comprise a UL request requesting for allocation of radio resources on an UL shared channel for communication of at least one data unit 300 comprising the application transaction 310 in the payload section 302 thereof.

At 1042, the eNB 112 monitors the UL resource allocation. E.g., as part of 1042, radio resources 406 may be allocated to the terminal 130 which ensure fulfillment of the transaction service agreement 500 (cf. FIGS. 7, 8A, 8B). It would also be possible to passively monitor whether the resource allocation according to standard scheduling based on a transmission service agreement 151 already fulfills the transaction service agreement 500. An UL grant may be communicated from the eNB 112 to the terminal 130, e.g., in a scenario in which dedicated grants are employed. In case of semi-persistent scheduling an UL grant may also be expendable if sufficient radio resources in order to fulfill the transaction service agreement.

Transmission 1043: the at least one data unit 300 is transmitted from the terminal 130 to the eNB 112.

Transmission 1044: the at least one data unit received 300 from the terminal 130 at 1043 is relayed to the backend 140.

Transmission 1045: depending on the type of the application transaction, the backend 140 may respond by transmitting at least one data unit 300 including a response associated with the application transaction 310 previously communicated an UL direction.

At 1046, the eNB 112 monitors the DL resource allocation. E.g., as part of 1046, radio resources 406 may be allocated for DL transmission which ensure fulfillment of the transaction service agreement 500. It would also be possible to passively monitor whether the resource allocation according to standard scheduling based on a transmission service agreement 151 already fulfills the transaction service agreement. A DL assignment may be communicated from the eNB 112 to the terminal 130, e.g., in a scenario where dedicated assignments are employed. In case of semi-persistent scheduling transmission of the DL assignment may be expendable if sufficient radio resources are available in order to fulfill the transaction service agreement.

Transmission 1047: the eNB 112 relays the at least one data unit 300 in the allocated DL radio resources to the terminal 130.

At 1048, the eNB 112 writes data indicative of executing the communication of the application transaction 310 to a log file. Based on the log file, it is possible to conclude on whether communication of application transactions 310 is in compliance with the transaction service agreement. E.g., a success rate/failure rate may be determined. The log file may indicate features selected from the group comprising: size of the application transaction 310; time of communicating the application transaction 310; delay in communicating the application transaction 310; etc.

In the various examples disclosed herein, charging functionality may be implemented based on the log file. E.g., where communication of the application transaction is executed in compliance with the transaction service agreement, a subscriber may be correspondingly charged, e.g., according to a charging plan. E.g., to issue a certain number of lookup requests in a backend database may cost a certain amount of money; charging can also be implemented based on incremental application transactions.

Transmission 1049: the eNB 112 reports the fulfillment of the transaction service agreement to the operator 171 periodically and/or on request by the operator. Here, the data indicative of executing of the communication of the application transaction 310 written to the log file at 1048 may be taken into account.

Figure 15:
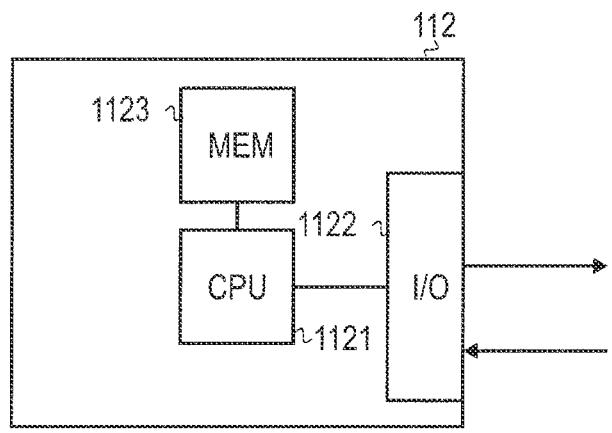
FIG. 15 schematically illustrates a radio access node according to various embodiments.

FIG. 15 is a schematic illustration of the eNB 112. The eNB 112 comprises a processor 1121. The processor 1121 is coupled with an interface 1122 in the memory 1123, e.g., a non-volatile memory. The interface 1122 is configured to transmit at least one data unit 300 using radio resources 406. The at least one data unit 300 may comprise an application transaction. The memory 1123 comprises control instructions that can be executed by the processor 1121. Executing the control instructions can cause the processor 1121 to perform techniques as described herein, e.g.: identifying an application transaction 310 comprised in the payload section 302 of the at least one data unit 300; performing SPI and/or DPI; controlling allocation of radio resources 406; monitoring scheduling and/or link adaptation; and allocating radio resources.

Figure 16:
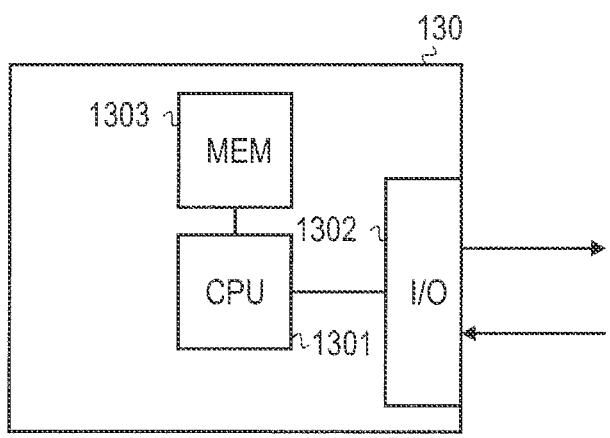
FIG. 16 schematically illustrates a terminal according to various embodiments.

FIG. 16 is a schematic illustration of the terminal 130. The terminal 130 comprises a processor 1301. The processor 1301 is coupled with an interface 1302 and a memory 1303, e.g., a non-volatile memory. The interface 1302 is configured to transmit at least one data unit 300 using radio resources 406. The at least one data unit 300 may comprise an application transaction 310. The memory 1303 comprises control instructions that can be executed by the processor 1301. Executing the control instructions can cause the processor 1301 to perform techniques as described herein, e.g.: identifying an application transaction 310 comprised in the payload section 302 of the at least one data unit 300; performing SPI and/or DPI; controlling allocation of radio resources 406; monitoring scheduling and/or link adaptation; and allocating radio resources.

Figure 17:
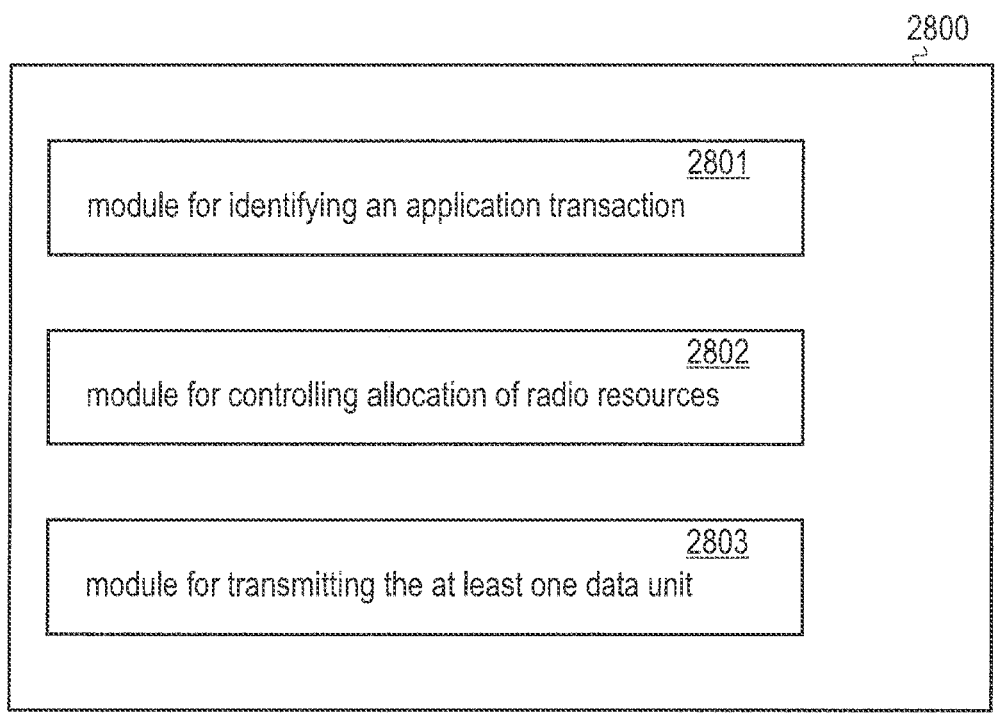
FIG. 17 schematically illustrates a device according to various embodiments.

FIG. 17 is a schematic illustration of a device 2800. The device 2800 may be embodied by the eNB 112.

The device 2800 is enhanced with logic facilitating communication of application transactions in compliance with the transaction service agreement 500. Such logic facilitates identifying an application transaction 310 in the payload section 302 of at least one data unit 300; e.g., the beginning and the end of an individual application transaction 310 can be identified in a data flow of packetized data such as the data bearer 150. By controlling allocation of radio resources for transmission of the at least one data unit, communication of the application transaction in compliance with transaction service agreement can be facilitated; e.g., certain success rate requirements and/or latency requirements can be met.

The device 2800 comprises a module for identifying an application transaction 2801, the application transaction 310 being comprised in a payload section 302 of at least one data unit 300. The module 2801 can also be referred to as Transaction Detector (TD).

The device 2800 further comprises a module 2802 for controlling allocation of radio resources 406. The module 2802 can also be referred to as Transaction Supervisor (TS).

The device 2800 further comprises a module 2803 for transmitting the at least one data unit 300 using the radio resources 406 allocated by the module 2802.

The TD 2801 and the TS 2802 may interwork with a link adaptation and scheduling mechanism to ensure that application transactions 310 communicated between the terminal 130 and the backend 160 meet the transaction service agreement 500, i.e., are communicated in compliance with the transaction service agreement 500. The TS 2802 may also be configured to measure the transaction volume and write to a log file to which extent communication has been in compliance with the transaction service agreement 500, e.g., resolved for each terminal 130 and/or resolve for each backend 160.

Considering that the terminal 130 having a transaction subscription communicates with the backend 160: e.g., the application transaction 310 may comprise a 1 kB UL request from the terminal 130 followed by a 0.1 kB DL response from the backend 160. Such an application transaction 310 may be communicated once every second. It may be assumed that it is required that the response of each application transaction 310 is required to reach the terminal 113 within 100 ms from the start of the application transaction 310.

Then, the TD 2801 can be configured to identify application transactions 310 in UL data units 300 transmitted from the terminal 130 and/or in DL data units 300 transmitted from the backend 160. The TD 2801 identifying an application transaction 310 informs the TS 2802 accordingly if the corresponding terminal 130 is associated with the transaction service agreement 500. The TS 2802 is configured to look up the transaction service agreement 500 for the terminal 130 and determine whether certain constraints of the transaction service agreement 500 are met, i.e., determine whether the application transaction 310 is eligible for communication under the transaction service agreement 500. In the affirmative, the TS 2802 informs scheduling about the transmission requirements. In the example, the TS 2802 informs scheduling that the next 1 kB of data are required to be transmitted on the UL channel within the next 50 ms and that the next 0.1 kB of DL data are required to be transmitted within 100 ms.

The scheduling adjusts the allocation of radio resources 406, if needed, for compliance with the transaction service agreement 500. Alternatively or additionally, the scheduling adjusts link adaptation, if needed, for compliance with the transaction service agreement 500. A success rate is reported back to the TS 2802. With respect to the success rate, a cause for a potential failure to communicate the application transaction 310 in compliance with the transaction service agreement 500 can be reported. E.g., a distinction can be made whether compliance with the transaction service agreement 500 has not been possible due to radio performance/over-utilization; or the at least one data unit 300 arriving to slowly from the terminal 130 of the backend 160.

Such control of application resources may also take advantage of the possibility of delaying the application transaction 310, prioritizing other subscribers/terminals, as long as the application transaction 310 is communicated in compliance with the transaction service agreement 500.

The TS 2802 publishes a log file indicative of the fulfillment results of the transaction service agreement 500, e.g., to the operator 171, the eNB 112, or a subscriber associated with the terminal 130 and/or the backend 160.

The TD 2801 and the TS 2802 can use a combination of the following schemes for configuring a transaction service agreement 500. Frist, explicit terminal/backend provisioning on the O&M interface by an Operation Support System (OSS), e.g., via a local port connection directly to the terminal and/or via an aggregator input/output node in a OSS/Business Support System (BSS) environment. E.g., it is possible to indicate an identification of the data bearer 150 associated with the subscriber and used for transmitting the at least one data unit 300 comprising the application transaction 310 and/or an identification of the subscriber/terminal 130 and/or an identification of the backend 160 by a respective control message. Second, through bearer and subscriber profile association configured advanced by the eNB O&M interface by OSS/BSS specifying the properties of the transaction service agreement 500 that are associated with a certain data bearer in combination with any suitable terminal 130 assigned subscriber profile information.

The TD 2801 can use different detection schemes for identifying application transactions 310. The detection scheme can be configurable by the operator 171 on the O&M interface. In a first example of a detection scheme, explicit and on-demand control signaling is employed at the beginning and/or end of an application transaction 310. The control signaling can be between the backend 160 and the eNB 112, e.g., via the operator 171 and on the O&M interface. In a second example of a detection scheme, on-the-flight DPI of the payload sections 302 of data units 300 of the user plane is performed. Thereby, the start of an application transaction 310 can be identified, e.g., by identifying an IP datagram arriving or a TCP session being set up. Third, through explicit user plane signaling between the backend 160 and the terminal 130 indicating the start of an application transaction 310. This can correspond to detecting in-line control signaling of the application layer.

The legacy bearer selection can be used in order to determine the particular data bearer 150 used for transmitting the at least one data unit 300 comprising the application transaction 310. The data bearer 150 selected may thus be the default bearer or a dedicated bearer.

Figure 18:
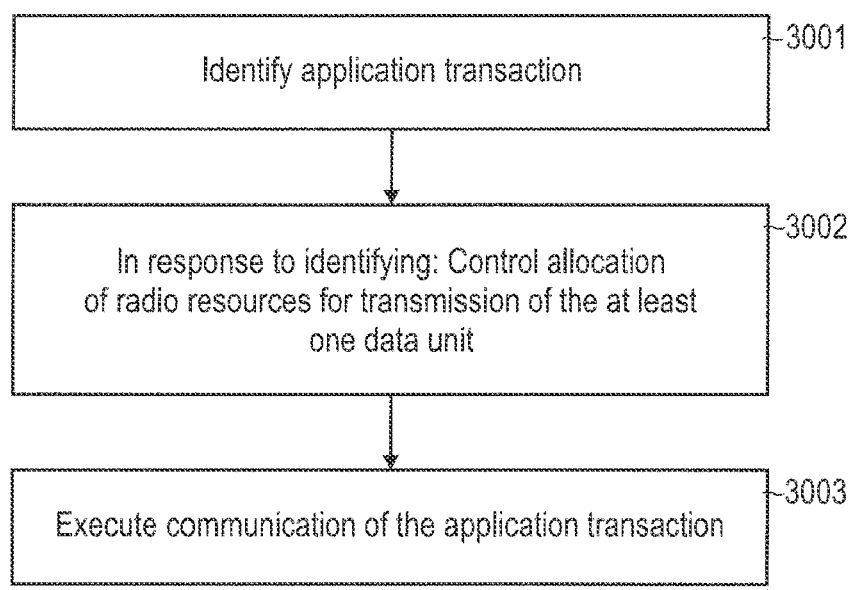
FIG. 18 is a flowchart of a method according to various embodiments.

FIG. 18 is a flowchart of a method according to various embodiments. At 3001, an application transaction 310 is identified. At 3001, one or more detection schemes can be employed, e.g., including DPI and/or SPI, detection of in-line control signaling, or explicit control signaling, e.g., between the eNB 112 and the backend 140, optionally via the operator 171.

At 3002, allocation of radio resources 406 is controlled. The radio resources 406 are used for transmission of the at least one data unit 300 which comprises the application transaction 310. 3002 may comprise passive and/or active steps.

E.g., at 3002, it is possible to monitor scheduling and/or link adaptation for a shared channel of the radio link 111; here, it is possible to take into account whether scheduling and/or link adaptation yield allocated radio resources which already enable communication of the application transaction 310 in compliance with the transaction service agreement 500. At 3002, it is possible to take into account link adaptation and/or scheduling which is executed based on the transmission service agreement 151.

Alternatively or additionally, at 3002, it is possible to actively allocated radio resources 406 which enable communication of the application transaction 310 in compliance with the transaction service agreement 500. Controlling allocation of the radio resources 406 at 3002 can take into account a bit rate constraint 570 of the transmission service agreement 151 associated with the terminal 130 and/or a subscriber of the terminal 130. Alternatively or additionally, controlling allocation of the radio resources 406 at 3002 can take into account a size of the at least one data unit 300 which comprises the application transaction 310.

At 3003, communication of the application transaction is executed by transmitting the at least one data unit 300 using the radio resources 406 previously allocated at 3002.

Figure 19:
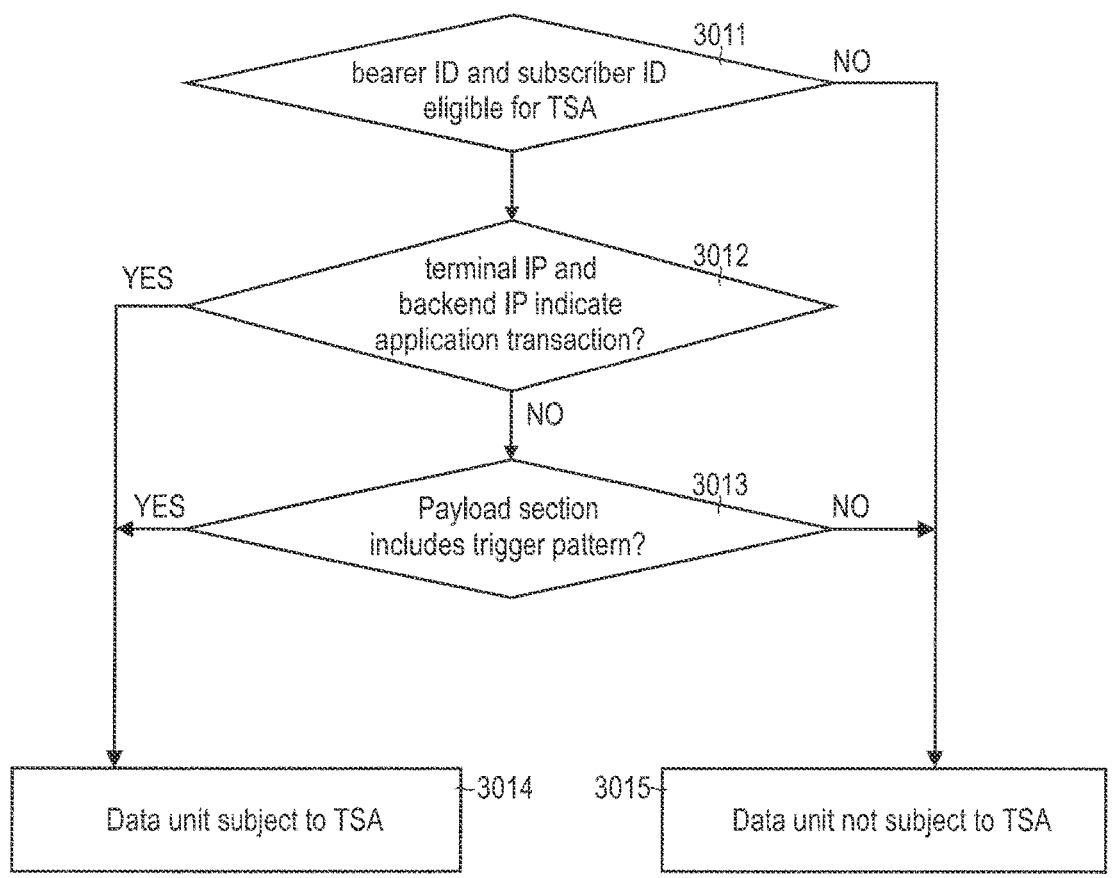
FIG. 19 is a flowchart of a method according to various embodiments.

FIG. 19 is a flowchart of a method according to various embodiments. FIG. 19 illustrates details of identifying the application transaction 310 in the payload section 302 of at least one data unit 300.

At 3011, it is checked whether the bearer ID used for transmission of the at least one data unit 300 and/or the IMSI/IMEI associated with the terminal 130 and/or a subscriber of the terminal 130 are generally eligible for the transaction service agreement 500. If this is not the case, it is judged that the at least one data unit 300 is not subject to the transaction service agreement 500 (labeled TSA in FIG. 19), 3015.

Otherwise, at 3012, it is checked whether the IP address of the terminal 130 and/or the IP address of the backend 160 indicate the presence of an application transaction 310. For the purposes of 3012, SPI can be performed and the header section 301 of the at least one data unit 300 can be inspected.

If, based on 3012, an application transaction 310 is already identified, it is judged that the respective at least one data unit is subject to the transaction service agreement 500, 3014.

Otherwise, at 3013, the payload section 302 of the at least one data unit 300 is inspected. Here, the payload section 302 can be inspected for a trigger pattern. For the purposes of 3013, DPI can be employed.

If, based on 3013, an application transaction 310 is identified, it is judged that the respective at least one data unit 300 is subject to the transaction service agreement 500, 3014. Otherwise, it is judged that the at least one data unit 300 is not subject to the transaction service agreement 500, 3015.

Summarizing, above techniques have been described which enable to control allocation of radio resources based on identifying application transactions in payload sections of data units. Thereby, a link between otherwise encapsulated higher and lower layers of a protocol stack can be implemented, allowing to facilitate connectivity of an application by considering individual application transactions.

In particular, a link can be established between lower layers typically delivering performance characteristics in terms of on-average bits per second in the framework of a GBR, and higher layers typically requiring performance characteristics in terms of individual application transactions.

The techniques described herein avoid the need of implementing overprovisioning. Thereby, the overall performance characteristics of a radio link can benefit. On the other hand, it is possible to commit to a certain transaction service agreement specifying guarantees for a subscriber communicating application transactions.

Committing to the transaction service agreement becomes possible by monitoring and influencing scheduling and/or link adaptation for data units comprising application transactions.

By means of a transaction service agreement, it is possible to enhance existing radio communication systems such as cellular network with new application transaction-based capabilities. Thereby, infrastructure investment in the radio spectrum can be protected. Furthermore, operators can offer to charge flexibly with respect to application transactions. Various transaction service agreements can be implemented flexibly. Radio utilization costs can be managed for application transaction-based services. Overprovisioning can be avoided. Subscribers are enable to use radio communication for communicating application transactions with well-defined performance characteristics. Expensive wireline equipment and infrastructure can be avoided.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., while above various examples have been discussed with respect to DL data units, respective scenarios may be readily applied for UL data units.

What is claimed is:

1. A method, comprising:
   identifying an application transaction comprised in a payload section of at least one data unit;
   in response to identifying the application transaction, controlling allocation of radio resources for transmission of the at least one data unit on a radio link to comply with a transaction service agreement including a transaction level QoS rule for the identified transaction; and
   executing communication of the application transaction via the radio link by transmitting the at least one data unit using the radio resources.

2. The method of claim 1, wherein the transaction service agreement specifies a guaranteed number of executed communications of application transactions via the radio link per time unit.

3. The method of claim 2, wherein the transaction service agreement specifies a guaranteed number of successfully completed communications of application transactions via the radio link per time unit.

4. The method of claim 2, wherein the transaction service agreement specifies the time unit.

5. The method of claim 1, wherein the transaction service agreement specifies:
   a size constraint for candidate application transactions;
   a timing constraint for candidate application transactions;
   a number constraint for candidate application transactions; and/or
   an overusage criterion for temporarily breaching a constraint for candidate application transactions.

6. The method of claim 1, wherein the controlling of allocation of the radio resources depends on a size of the at least one data unit and a bit rate constraint, the bit rate constraint being specified by a transmission service agreement for transmission of the at least one data unit on a bearer.

7. The method of claim 6, wherein the controlling of allocation of the radio resources selectively breaches the bit rate constraint depending on a traffic load on a shared channel of the radio link which comprises the radio resources.

8. The method of claim 4:
   wherein the controlling of allocation of the radio resources depends on a size of the at least one data unit and a bit rate constraint, the bit rate constraint being specified by a transmission service agreement for transmission of the at least one data unit on a bearer;
   wherein the controlling of allocation of the radio resources selectively breaches the bit rate constraint depending on a traffic load on a shared channel of the radio link which comprises the radio resources;
   wherein the controlling of the allocation of the radio resources comprises allocating the radio resources based on the specified time unit and the bit rate constraint.

9. The method of claim 8, further comprising:
selecting at least one frequency band from a plurality of candidate frequency bands,
wherein the radio resources are allocated in the selected at least one frequency band.

10. The method of claim 9, wherein the selected at least one frequency band is dedicated to communication of application transactions.

11. The method of claim 8, wherein the allocating of the radio resources comprises locally optimizing the allocation of the radio resources for the at least one data unit based on the specified time unit and the bit rate constraint.

12. The method of claim 1, wherein the controlling of the allocation of the radio resources comprises monitoring scheduling for a shared channel of the radio link which comprises the radio resources.

13. The method of claim 1, further comprising writing data indicative of the executing of the communication of the application transaction to a log file.

14. The method of claim 1, wherein the identifying of the application transaction comprises inspecting at least one of a header section of the at least one data unit and the payload section of the at least one data unit for a predefined data pattern.

15. The method of claim 1, wherein the identifying of the application transaction comprises receiving a control message comprising an indicator indicative of the at least one data unit.

16. The method of claim 1, wherein the identifying of the application transaction is selectively executed depending on at least one of:
an identification of a bearer associated with a subscriber and used for transmitting the at least one data unit; and
an identification of the subscriber.

17. The method of claim 1, wherein the application transaction comprises an HTTP operation.

18. A device, comprising:
processing circuitry;
memory containing instructions executable by the processing circuitry whereby the device is operative to:
identify an application transaction comprised in a payload section of at least one data unit;
in response to the identifying the application transaction, control allocation of radio resources for transmission of the at least one data unit on a radio link to comply with a transaction service agreement including a transaction level QoS rule for the identified transaction; and
execute communication of the application transaction via the radio link by transmitting the at least one data unit using the radio resources.

19. A non-transitory computer readable recording medium storing a computer program product for controlling a device, the computer program product comprising software instructions which, when run on processing circuitry of the device, causes the device to:
identify an application transaction comprised in a payload section of at least one data unit;
in response to the identifying the application transaction, control allocation of radio resources for transmission of the at least one data unit on a radio link to comply with a transaction service agreement for the identified transaction; and
execute communication of the application transaction via the radio link by transmitting the at least one data unit using the radio resources.

* * * * *

UNITED STATES PATENT AND TRADEMARK OFFICE
CERTIFICATE OF CORRECTION

PATENT NO. : 11,653,270 B2
APPLICATION NO. : 17/093077
DATED : May 16, 2023
INVENTOR(S) : Melander et al.

Page 1 of 4

It is certified that error appears in the above-identified patent and that said Letters Patent is hereby corrected as shown below:

On the Title Page

In Item (57), under "ABSTRACT", in Column 2, Line 2, delete "is identifying." and insert -- is identified. --, therefor.

In the Drawings

In Fig. 10, Sheet 8 of 15, for Tag "1001", in Line 1, delete "TSLA;" and insert -- TSA; --, therefor.

In Fig. 10, Sheet 8 of 15, for Tag "1002", in Line 1, delete "TSLA:" and insert -- TSA: --, therefor.

In Fig. 13, Sheet 10 of 15, delete " 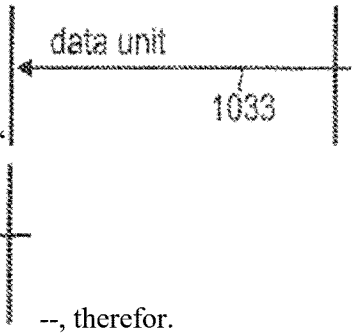 " and insert -- , therefor.

In the Specification

In Column 1, Line 8, delete "2018," and insert -- 2018, now Pat. No. 10,869,231, --, therefor.

In Column 1, Line 26, delete "Third Generation Partnership (3GPP)" and insert -- Third Generation Partnership Project (3GPP) --, therefor.

Signed and Sealed this
Eighth Day of October, 2024

Katherine Kelly Vidal
*Director of the United States Patent and Trademark Office*

CERTIFICATE OF CORRECTION (continued)
U.S. Pat. No. 11,653,270 B2

In Column 1, Lines 28-30, delete "3GPP Technical Specification (TS) 3GPP Technical Specification (TS) V13.6.0" and insert -- 3GPP Technical Specification (TS) V13.6.0 --, therefor.

In Column 5, Line 22, delete "In may" and insert -- It may --, therefor.

In Column 5, Line 39, delete "scenarios of the" and insert -- scenarios the --, therefor.

In Column 5, Line 40, delete "may considered" and insert -- may be considered --, therefor.

In Column 5, Line 54, delete "an Hypertext" and insert -- a Hypertext --, therefor.

In Column 6, Line 30, delete "transaction:," and insert -- transaction: --, therefor.

In Column 6, Line 39, delete "FIG. 1" and insert -- FIG. 1A --, therefor.

In Column 6, Line 41, delete "FIG. 1" and insert -- FIG. 1A --, therefor.

In Column 6, Line 42, delete "Third Generation Partnership (3GPP)" and insert -- Third Generation Partnership Project (3GPP) --, therefor.

In Column 6, Lines 46-47, delete "Wideband Code Division Multiplex (WCDMA)," and insert -- Wideband Code Division Multiple Access (WCDMA), --, therefor.

In Column 6, Line 56, delete "Wi-Fi) radio" and insert -- Wi-Fi), radio --, therefor.

In Column 6, Line 59, delete "FIG. 1," and insert -- FIG. 1A, --, therefor.

In Column 6, Lines 59-60, delete "E-UTRA RAT 113B" and insert -- E-UTRA 113B --, therefor.

In Column 6, Line 60, delete "an radio" and insert -- a radio --, therefor.

In Column 7, Line 13, delete "FIG. 1," and insert -- FIG. 1A, --, therefor.

In Column 7, Line 47, delete "FIG. 1" and insert -- FIG. 1A --, therefor.

In Column 7, Line 53, delete "LTE-uU" and insert -- LTE-Uu --, therefor.

In Column 8, Lines 21-22, delete "Policy and Charging Policy and Charging Enforcement Function (PCEF)" and insert -- Policy and Charging Enforcement Function (PCEF) --, therefor.

In Column 8, Line 48, delete "in in different" and insert -- in different --, therefor.

In Column 9, Line 9, delete "is to transport" and insert -- is transport --, therefor.

In Column 10, Line 34, delete "transaction service agreement" and insert -- application transaction --, therefor.

CERTIFICATE OF CORRECTION (continued)
U.S. Pat. No. 11,653,270 B2

In Column 10, Lines 36-37, delete "transaction service agreement" and insert -- application transaction --, therefor.

In Column 11, Line 50, delete "an transaction" and insert -- a transaction --, therefor.

In Column 12, Line 61, delete "on the a timescale" and insert -- on a timescale --, therefor.

In Column 13, Line 66, delete "310 is specified" and insert -- 310 specified --, therefor.

In Column 13, Line 67, delete "constant: This" and insert -- constant. This --, therefor.

In Column 15, Line 41, delete "from to," and insert -- from t0, --, therefor.

In Columns 18 & 19, Lines 67 & 1, delete "International Mobile Station Equipment Identity (IMEI);" and insert -- International Mobile Equipment Identity (IMEI); --, therefor.

In Column 20, Line 59, delete "form the" and insert -- from the --, therefor.

In Column 23, Line 2, delete "backend 160" and insert -- backend 140 --, therefor.

In Column 23, Line 9, delete "backend 160." and insert -- backend 140. --, therefor.

In Column 23, Line 11, delete "backend 160:" and insert -- backend 140: --, therefor.

In Column 23, Line 14, delete "backend 160." and insert -- backend 140. --, therefor.

In Column 23, Line 23, delete "backend 160." and insert -- backend 140. --, therefor.

In Column 23, Line 49, delete "arriving to slowly" and insert -- arriving too slowly --, therefor.

In Column 23, Line 50, delete "backend 160." and insert -- backend 140. --, therefor.

In Column 23, Line 59, delete "backend 160." and insert -- backend 140. --, therefor.

In Column 23, Line 62, delete "Frist," and insert -- First, --, therefor.

In Column 24, Line 4, delete "backend 160" and insert -- backend 140 --, therefor.

In Column 24, Line 17, delete "backend 160" and insert -- backend 140 --, therefor.

In Column 24, Line 25, delete "backend 160" and insert -- backend 140 --, therefor.

In Column 24, Line 55, delete "allocated" and insert -- allocate --, therefor.

CERTIFICATE OF CORRECTION (continued)
U.S. Pat. No. 11,653,270 B2

In Column 25, Line 14, delete "backend 160" and insert -- backend 140 --, therefor.

In Column 25, Line 64, delete "are enable" and insert -- are enabled --, therefor.